United States Patent

Nakayama et al.

(10) Patent No.: US 9,841,293 B2
(45) Date of Patent: Dec. 12, 2017

(54) IN-VEHICLE DISPLAY SYSTEM FOR NAVIGATION AND ADDITIONAL FUNCTIONS

(75) Inventors: Kiyoshi Nakayama, Kawagoe (JP); Masato Takahashi, Tokorozawa (JP)

(73) Assignee: CALRION CO., LTD., Saitama (JP)

( * ) Notice: Subject to any disclaimer, the term of this patent is extended or adjusted under 35 U.S.C. 154(b) by 0 days.

(21) Appl. No.: 13/318,376

(22) PCT Filed: Jan. 26, 2011

(86) PCT No.: PCT/JP2011/051514
§ 371 (c)(1),
(2), (4) Date: Nov. 1, 2011

(87) PCT Pub. No.: WO2011/093346
PCT Pub. Date: Aug. 4, 2011

(65) Prior Publication Data
US 2012/0287262 A1   Nov. 15, 2012

(30) Foreign Application Priority Data

Jan. 26, 2010   (JP) .................................. 2010-014789
Jan. 26, 2010   (JP) .................................. 2010-014793

(51) Int. Cl.
*H04N 7/00*      (2011.01)
*G01C 21/36*    (2006.01)
(Continued)

(52) U.S. Cl.
CPC .......... *G01C 21/3688* (2013.01); *B60K 35/00* (2013.01); *B60K 37/06* (2013.01);
(Continued)

(58) Field of Classification Search
CPC ....... H04N 21/440263; H04N 5/44504; H04N 5/45; H04N 21/4316; B60K 35/00;
(Continued)

(56) References Cited

U.S. PATENT DOCUMENTS 6,144,296 A    11/2000  Ishida et al.
6,314,370 B1 *  11/2001  Curtright ...................... 701/412
(Continued)

FOREIGN PATENT DOCUMENTS

CN    1704886    12/2005
CN    1928587    3/2007
(Continued)

OTHER PUBLICATIONS

English translation and its original Japanese Notification of Reasons for Rejection issued in the corresponding Japanese application (JP2011-533474), Nov. 2, 2011.
(Continued)

*Primary Examiner* — Joseph Ustaris
*Assistant Examiner* — Jill Sechser
(74) *Attorney, Agent, or Firm* — McCarter & English, LLP

(57) ABSTRACT

An in-vehicle information apparatus includes a main unit having a display device, and a navigation unit providing a navigation function to the main unit. The navigation unit includes a navigation processing unit a sub unit providing an addition function to the navigation unit, and a navigation unit screen generating unit which generates a navigation unit screen for displaying information concerning a function which the navigation unit provides. The main unit includes an operation unit which receives an input for selecting a function from a user, a main unit screen generating unit which generates a main unit screen for displaying information concerning a function which the main unit provides, and a video selector which selects one of the navigation unit screen and the main unit screen.

10 Claims, 21 Drawing Sheets

(51) Int. Cl.
*B60K 35/00* (2006.01)
*B60K 37/06* (2006.01)

(52) U.S. Cl.
CPC ............. *B60K 2350/1004* (2013.01); *B60K 2350/1032* (2013.01); *B60K 2350/1096* (2013.01)

(58) Field of Classification Search
CPC ........... B60K 37/06; B60K 2350/1096; B60K 2350/1004; B60K 2350/1032; G01C 21/3688
See application file for complete search history.

(56) References Cited

U.S. PATENT DOCUMENTS

| | | | |
|---|---|---|---|
| 8,151,210 B2 | 4/2012 | Nezu et al. | |
| 8,458,618 B2 | 6/2013 | Nezu et al. | |
| 2006/0012715 A1* | 1/2006 | Abe | H04N 21/44026 348/584 |
| 2008/0094421 A1* | 4/2008 | Maeda | G06F 3/0481 345/661 |
| 2008/0147321 A1 | 6/2008 | Howard et al. | |
| 2009/0257205 A1* | 10/2009 | Itoh et al. | 361/747 |
| 2010/0117810 A1* | 5/2010 | Hagiwara et al. | 340/425.5 |
| 2010/0144398 A1* | 6/2010 | Abeta | 455/569.2 |
| 2013/0246918 A1 | 9/2013 | Nezu et al. | |
| 2013/0246961 A1 | 9/2013 | Nezu et al. | |

FOREIGN PATENT DOCUMENTS

| | | |
|---|---|---|
| EP | 1 370 078 | 12/2003 |
| EP | 1976244 | 10/2008 |
| EP | 2081369 | 7/2009 |
| EP | 2091784 | 8/2009 |
| JP | HEI 11-118497 | 4/1999 |
| JP | 2003-344052 | 12/2003 |
| JP | 2005-343241 | 12/2005 |
| JP | 2009-25254 | 2/2009 |
| JP | 2009-035024 | 2/2009 |
| JP | 2009-49825 | 3/2009 |
| JP | 2009-120053 | 6/2009 |
| JP | 2009-204590 | 9/2009 |
| JP | 2009-266265 | 11/2009 |
| WO | 2008/079891 | 7/2008 |
| WO | 2009/016917 | 2/2009 |

OTHER PUBLICATIONS

International Search Report issued in the parent PCT application (PCT/JP2011/051514), dated Apr. 19, 2011.
Chinese Office Action issued in Application No. 201180002908.0 dated Jan. 20, 2014.
Chinese Office Action issued in Application No. 201180002908.0 dated Aug. 26, 2014.
Extended European Search Report issued in Application No. 11737059.3 dated Jan. 7, 2016.

* cited by examiner

SCREEN TRANSITION WHEN INCOMING CALL IS RECEIVED DURING DISPLAYING OF MAIN UNIT SCREEN

| STEP | NAVIGATION UNIT SCREEN (NAVI-SCREEN) | MAIN UNIT SCREEN (MAIN SCREEN) | SCREEN SELECTED BY VIDEO SELECTOR | DISPLAY SCREEN |
|---|---|---|---|---|
| PHASE A1' (AT START UP) | SCREEN N | SCREEN H | MAIN SCREEN | SCREEN H |
| PHASE A2' (RADIO IN USE) | SCREEN N | SCREEN T | MAIN SCREEN | SCREEN T |
| PHASE A3' (RECEIVING CALL) | SCREEN PI | SCREEN T | NAVI-SCREEN | SCREEN PI |
| PHASE A4'-a (AFTER INCOMING CALL REJECTION) | SCREEN N | SCREEN T | MAIN SCREEN | SCREEN T |
| PHASE A4'-b (DURING CALL) | SCREEN PC | SCREEN T | NAVI-SCREEN | SCREEN PC |
| PHASE A5' (AFTER CALL END) | SCREEN N | SCREEN T | MAIN SCREEN | SCREEN T |

FIG. 24

SCREEN TRANSITION WHEN INCOMING CALL IS RECEIVED DURING DISPLAYING OF NAVIGATION UNIT SCREEN

| STEP | NAVIGATION UNIT SCREEN (NAVI-SCREEN) | MAIN UNIT SCREEN (MAIN SCREEN) | SCREEN SELECTED BY VIDEO SELECTOR | DISPLAY SCREEN |
|---|---|---|---|---|
| (AT START UP) | SCREEN N | SCREEN H | MAIN SCREEN | SCREEN H |
| (NAVI IN USE) | SCREEN N | SCREEN H | NAVI-SCREEN | SCREEN N |
| (RECEIVING CALL) | SCREEN PI | SCREEN H | NAVI-SCREEN | SCREEN PI |
| (AFTER INCOMING CALL REJECTION) | SCREEN N | SCREEN T | NAVI-SCREEN | SCREEN N |
| (DURING CALL) | SCREEN NC | SCREEN T | NAVI-SCREEN | SCREEN NC |
| (AFTER CALL END) | SCREEN N | SCREEN T | NAVI-SCREEN | SCREEN N |

FIG. 25

SCREEN TRANSITION WHEN OUTGOING CALL IS INITIATED DURING DISPLAYING OF MAIN UNIT SCREEN

| STEP | NAVIGATION UNIT SCREEN (NAVI-SCREEN) | MAIN UNIT SCREEN (MAIN SCREEN) | SCREEN SELECTED BY VIDEO SELECTOR | DISPLAY SCREEN |
|---|---|---|---|---|
| (AT START UP) | SCREEN N | SCREEN H | MAIN SCREEN | SCREEN H |
| (RADIO IN USE) | SCREEN N | SCREEN T | MAIN SCREEN | SCREEN T |
| PHASE C3' (Home BUTTON SELECTION) | SCREEN N | SCREEN H | MAIN SCREEN | SCREEN H |
| PHASE C4' (Tel BUTTON SELECTION) | SCREEN PM | SCREEN H | NAVI-SCREEN | SCREEN PM |
| PHASE C5' (Phonebook BUTTON SELECTION) | SCREEN PB | SCREEN H | NAVI-SCREEN | SCREEN PB |
| PHASE C6' (SELECTION OF THE OTHER PARTY) | SCREEN PA | SCREEN H | NAVI-SCREEN | SCREEN PA |
| PHASE C7' (DURING CALL) | SCREEN PC | SCREEN H | NAVI-SCREEN | SCREEN PC |
| PHASE C8' (AFTER CALL END) | SCREEN N | SCREEN T | MAIN SCREEN | SCREEN T |

FIG. 27

SCREEN TRANSITION WHEN OUTGOING CALL IS INITIATED DURING DISPLAYING OF NAVIGATION UNIT SCREEN

| STEP | NAVIGATION UNIT SCREEN (NAVI-SCREEN) | MAIN UNIT SCREEN (MAIN SCREEN) | SCREEN SELECTED BY VIDEO SELECTOR | DISPLAY SCREEN |
|---|---|---|---|---|
| (AT START UP) | SCREEN N | SCREEN H | MAIN SCREEN | SCREEN H |
| (NAVI IN USE) | SCREEN N | SCREEN H | NAVI-SCREEN | SCREEN N |
| PHASE D3' (Home BUTTON SELECTION) | SCREEN N | SCREEN H | MAIN SCREEN | SCREEN H |
| PHASE D4' (Tel BUTTON SELECTION) | SCREEN PM | SCREEN H | NAVI-SCREEN | SCREEN PM |
| (Phonebook BUTTON SELECTION) | SCREEN PB | SCREEN H | NAVI-SCREEN | SCREEN PB |
| (SELECTION OF THE OTHER PARTY) | SCREEN PA | SCREEN H | NAVI-SCREEN | SCREEN PA |
| PHASE D7' (DURING CALL) | SCREEN NC | SCREEN H | NAVI-SCREEN | SCREEN NC |
| PHASE D8' (AFTER CALL END) | SCREEN N | SCREEN H | NAVI-SCREEN | SCREEN N |

FIG. 28

IN-VEHICLE DISPLAY SYSTEM FOR NAVIGATION AND ADDITIONAL FUNCTIONS

CROSS-REFERENCE TO RELATED APPLICATIONS

This application is a U.S. National Stage of International Application No. PCT/JP2011/051514, filed Jan. 26, 2011, which includes a claim for priority based on Japanese Application Nos. JP2010-014793 and JP2010-014789, filed Jan. 26, 2010, the contents of which are incorporated herein by reference.

TECHNICAL FIELD

The present invention relates an in-vehicle information apparatus provided with a car navigation function, and particularly to an in-vehicle information apparatus provided with a broadcast receiving function and an audio and video medium reproducing function, in addition to the car navigation function.

BACKGROUND OF THE INVENTION

As conventional car navigation systems, a small portable navigation apparatus which is a so-called PND (Portable Navigation Device) and a frame-mounted type car navigation apparatus (in-vehicle information apparatus) which is fixed, for example, on a dashboard of a vehicle are widely known.

Since the functions of PND are simplified in comparison with an in-vehicle information apparatus, the cost for development and manufacturing of PND is relatively low, and therefore PNDs are distributed at low prices. Recently, as described in Japanese Patent Provisional Publication No. JP2009-025254A, PNDs with Bluetooth communication function Which enables a handsfree communication using a mobile phone having a Bluetooth communication function are becoming popular.

Regarding an in-vehicle information apparatus, it is also required to install a handsfree communication function from the view point of safety. For example, as described in Japanese Patent Provisional Publication No. JP2009-049825A, in-vehicle information apparatuses which enable a handsfree wireless communication function are becoming popular.

SUMMARY OF THE INVENTION

Although the in-vehicle information apparatus is different from PND in regard to having the broadcast receiving function and the audio and video medium reproducing function, it is possible to provide an inexpensive in-vehicle information apparatus by applying for example, a unitized PND, to the in-vehicle information apparatus to achieve simplification of a system, reduction in development cost and reduction in development term regarding the in-vehicle information apparatus because the in-vehicle information apparatus includes the navigation function and Bluetooth communication function of PND. However, PND is originally designed for a purpose different from that for the in-vehicle information apparatus, and PND is designed to provide, by itself, information (onscreen representation) required by a user. Therefore, the onscreen representation required for PND does not necessarily match the onscreen representation required for the in-vehicle information apparatus. Accordingly, if an in-vehicle information apparatus is configured such that PND is selected only for the navigation function and Bluetooth communication function by simply installing PND into the in-vehicle information apparatus, there may be a case where onscreen representation which is not necessarily desired by a user, such as representation of a navigation image not required by a user during the handsfree communication, is displayed.

The present invention is made in consideration of the above described circumstances. The objective of the present invention is to provide onscreen representation which is natural for users (not giving uncomfortable feeling to users) on an in-vehicle information apparatus having a plurality of functions including a car navigation function, without excessively complexifying a system, by coordinating on screen representation between units providing the functions.

An in-vehicle information apparatus according to the invention includes a main unit having a display device, and a navigation unit providing a navigation function to the main unit. The navigation unit includes a navigation processing unit which executes a process concerning the navigation function, a sub unit providing an addition function to the navigation unit, and a navigation unit screen generating unit which generates a navigation unit screen for displaying information concerning a function which the navigation unit provides. The main unit includes an operation unit which receives an input for selecting a function from a user, a main unit screen generating unit which generates a main unit screen for displaying information concerning a function which the main unit provides, and a video selector which selects one of the navigation unit screen and the main unit screen and provides the selected one to the display device. The addition function provided by the sub unit is executed by an interruption process, and the video selector selects one of the navigation unit screen and the main unit screen based on the function inputted to the operation unit and the addition function executed by the interruption process.

By configuring the in-vehicle information apparatus as described above, it becomes possible to achieve coordination in regard to onscreen representation between the units providing the functions, and to provide natural onscreen representation (not giving an uncomfortable feeling) to the user without excessively complexifying a system.

It is preferable that the navigation unit screen generating unit generates one of a first screen displaying information concerning the navigation function, a second screen displaying information concerning the addition function and a third screen in which the information concerning the addition function is superimposed on the information concerning the navigation function, based on the function inputted to the operation unit and the interruption process. The navigation unit screen generating unit may generate one of the second screen and the third screen based on a screen which the video selector has provided to the display device at a time of occurrence of the interruption process.

It is preferable that software for the navigation function for generating the first screen or the third screen and software for the addition function for generating the second screen are installed in the navigation unit screen generating unit, and the navigation unit screen generating unit switches between the software for the navigation function and the software for the addition function based on a command from the main unit.

With this configuration, the main unit is able to easily control the screen which the navigation unit screen generating unit generates.

It is preferable that the main unit further comprises a display screen notification unit which notifies the navigation unit of a screen which the video selector has provided to the display device at a time of occurrence of the interruption process. In this case, it is preferable that the navigation unit screen generating unit generates one of the second screen and the third screen based on a notification from the display screen notification unit. It is preferable that the navigation unit further comprises a display screen recognition unit which obtains the notification from the display screen notification unit and recognizes a screen which has been displayed on the display device at a time of occurrence of the interruption process, based on the notification.

With this configuration, it becomes possible to recognize, on the navigation unit side, the screen which was displayed at the time of occurrence of an interruption process. Since it is possible to predict information which the user wants, from the display screen at the time of occurrence of the interruption process, it becomes possible for the navigation unit to generate a screen which meets the user's need. Furthermore, it becomes possible to avoid occurrence of unrelated screen transition which would give an uncomfortable feeling to the user.

The in-vehicle information apparatus may further include a display screen notification request unit which requires the notification from the display screen notification unit. With his configuration, even when the interruption process occurs on the navigation unit side, it is possible to immediately recognize the display screen at the time of occurrence of the interruption process.

The display screen notification request unit may require the notification from the display screen notification unit when the interruption process occurs.

The sub unit may provide a communication function for communicating with an external device, and the interruption process may be a process which utilizes a function of the external device by using the communication function. The sub unit may be a Bluetooth unit which provides Bluetooth communication with the external device.

The external device may be a mobile phone. In this case, the interruption process may be a process for using a handsfree communication function of the mobile phone.

A main circuit board designed for a general-purpose or a different navigation apparatus may be mounted on the navigation unit.

According to the invention described in the claims, an inexpensive in-vehicle information apparatus capable of performing natural onscreen representation (which does not give an uncomfortable feeling to the user) is provided without excessively complexifying a system.

BRIEF DESCRIPTION OF THE DRAWINGS

FIG. 24 is a diagram illustrating screen transition caused when an incoming call is received during displaying of the main unit screen the in-vehicle information apparatus according to the second embodiment of the invention.

FIG. 25 is a diagram illustrating screen transition caused when an incoming call is received during displaying of the navigation unit screen in the in-vehicle information apparatus according to the second embodiment of the invention.

FIG. 27 is a diagram illustrating screen transition caused when an outgoing call is initiated during displaying of the main unit screen in the in-vehicle information apparatus according to the second embodiment of the invention.

FIG. 28 is a diagram illustrating screen transition caused when an outgoing call is initiated during displaying of the navigation unit screen in the in-vehicle information apparatus according to the second embodiment of the invention.

DETAILED DESCRIPTION OF EMBODIMENTS

Figure 1:
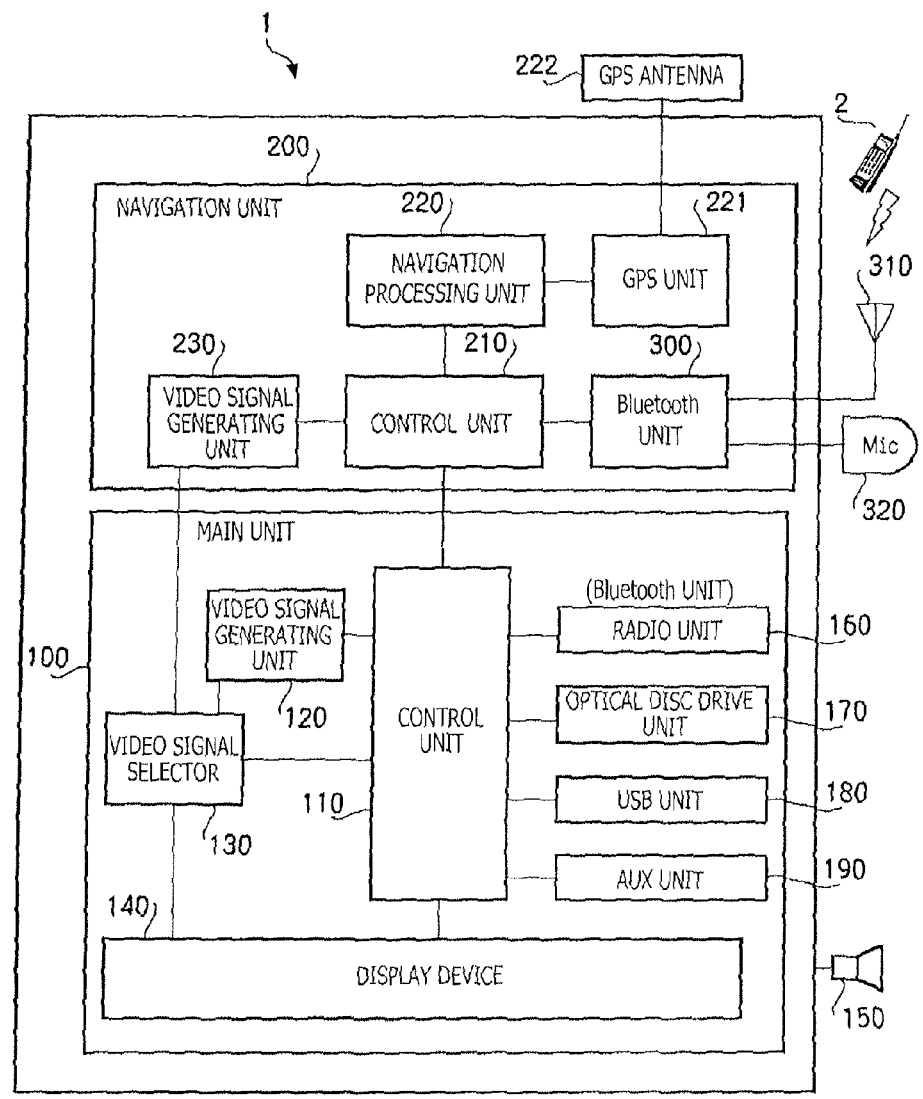
FIG. 1 is a block diagram generally illustrating a configuration of an in-vehicle information apparatus according to a first embodiment of the present invention.

In the following, embodiments of the invention are described with reference to the accompanying drawings. FIG. 1 is a block diagram illustrating a general configuration of an in-vehicle information apparatus 1 according a first embodiment of the invention. The in-vehicle information apparatus 1 is a multifunctional in-vehicle information apparatus having a radio receiving function and various types of audio and video reproducing functions, in addition to a car navigation function. In addition, the in-vehicle information apparatus 1 has a Bluetooth communication function achieving a handsfree communication in cooperation with a mobile phone with a Bluetooth function.

The in-vehicle information apparatus 1 includes a main unit 100 and a navigation unit 200. The main unit 100 is a main body totally controlling the entire in-vehicle information apparatus 1, and includes sub units providing various functions excepting the car navigation function and the Bluetooth communication function. The navigation unit 200 which is connected to the main unit 100 is configured as a function unit providing the car navigation function and the Bluetooth communication function.

The main unit 100 includes a control unit 110, a video signal generating unit 120, a video signal selector 130, a display device 140 and a speaker 150. The control unit 110 totally controls operations of the units constituting the main unit 100. The video signal generating unit 120 generates various types of display screens (main unit screens) regarding the various functions provided by the main unit 100, and outputs them as a video signal. Furthermore, the video signal generating unit 120 generates an audio signal corresponding to the generated display screen, and outputs the audio signal together with the video signal. The video signal selector 130 is a switch which selects a video signal to be displayed on the screen from the video signal of the navigation unit screen inputted from the navigation unit 200 which is described later and the video signal of the main unit screen. Furthermore, the video signal selector 130 has a function of selecting an audio signal to be outputted through the speaker from the audio signal inputted from the navigation unit 200 and the audio signal generated in the main unit. That is, the video signal selector 130 is a switch which is able to execute switching individually for two systems including a video signal system and an audio signal system. The display device 140 is a liquid crystal touch panel display device which displays screens based on the video signal selected by the video signal selector 130 and accepts a user input. The speaker 150 converts the audio signal selected and outputted by the video signal selector 130 into sound.

The main unit 100 further includes sub units, such as a radio unit 160, an optical disc drive unit 170, a USB unit 180 and an AUX unit 190. The radio unit 160 is a function unit which receives radio broadcasting. The optical disc drive unit 170 is a function unit which reproduces audio data and video data recorded in an optical disc, such as CD or DVD. The USB unit 180 is a function unit to which an external digital device having a USB (Universal Serial Bus) interface, such as a portable music player, is connected. The AUX unit 190 is a function unit which processes an audio signal and a video signal inputted from an external device through an external input terminal (AUX terminal), and outputs them through a speaker or a display.

The navigation unit 200 includes a control unit 210, a navigation processing unit 220, a GPS unit 221, a GPS antenna 222, a video signal generating unit 230 and a Bluetooth unit 300. The control unit 210 totally controls the entire navigation unit 200, and provides the navigation function and Bluetooth function to the main unit 100. The GPS unit 221 executes position measurement based on GPS (Global Positioning system) signals obtained by the GPS antenna 222, and provides a measurement result to the navigation processing unit 220. The navigation processing unit 220 executes a process regarding the navigation function based on the measurement result obtained from the GPS unit 221 and map information. The video signal generating unit 230 generates a display screen (a navigation unit screen) and sound regarding the function provided by the navigation unit 200, and outputs them as a video signal and an audio signal to the video signal selector 130 of the main unit.

The Bluetooth unit 300 is a module which realizes the handsfree communication function by connecting by wireless to the mobile phone 2 having the Bluetooth communication function. To the Bluetooth unit 300, an antenna 310 for communicating by wireless with Bluetooth devices and a microphone 320 for executing the handsfree communication are connected. In this embodiment, the control unit 210, the navigation processing unit 220, the GPS unit 221 and the video signal generating unit 230 are mounted on a main circuit board, and the Bluetooth unit 300 is formed as an extension module which is detachably attached to the main circuit board. However, the navigation unit 200 according to the invention is not limited to such a circuit board configuration. For example, in another embodiment, the Bluetooth unit may be directly mounted on the main circuit board.

In the control unit 210 of the navigation unit 200, a navigation application program for generating display screens and sound regarding the navigation function, and a Bluetooth application program for generating display screens and sound regarding the Bluetooth communication function. Although the control unit 210 executes a plurality of programs concurrently, only an application set as a main task is able to control the video signal generating unit 230 to generate the display screen and sound.

Hereafter, a process regarding onscreen representation executed when an interruption relating to the Bluetooth communication function occurs is explained.

Figure 2:
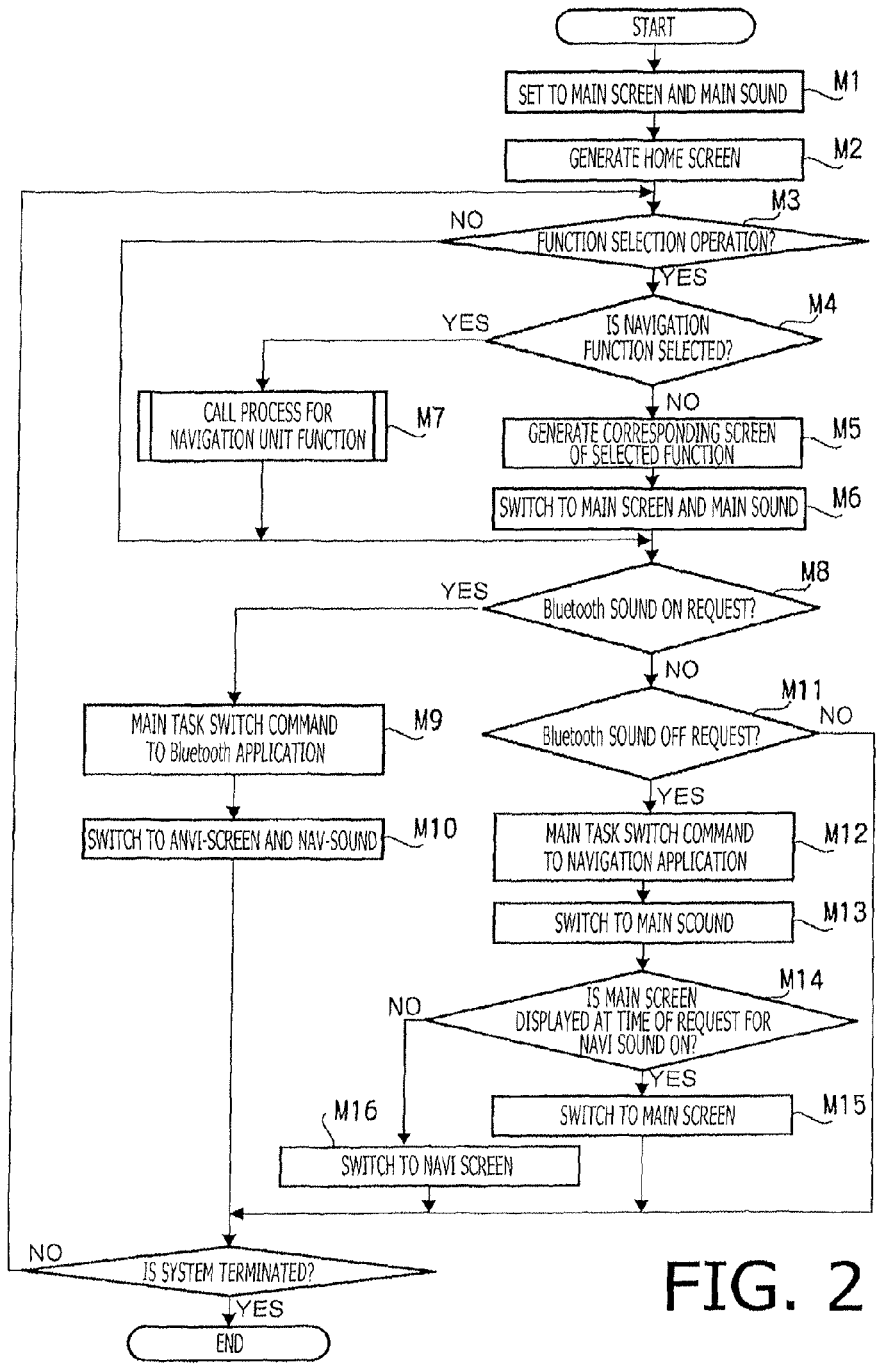
FIG. 2 is a flowchart illustrating a process regarding onscreen representation executed by a main unit in the in-vehicle information apparatus according to the first embodiment of the invention.
Figure 3:
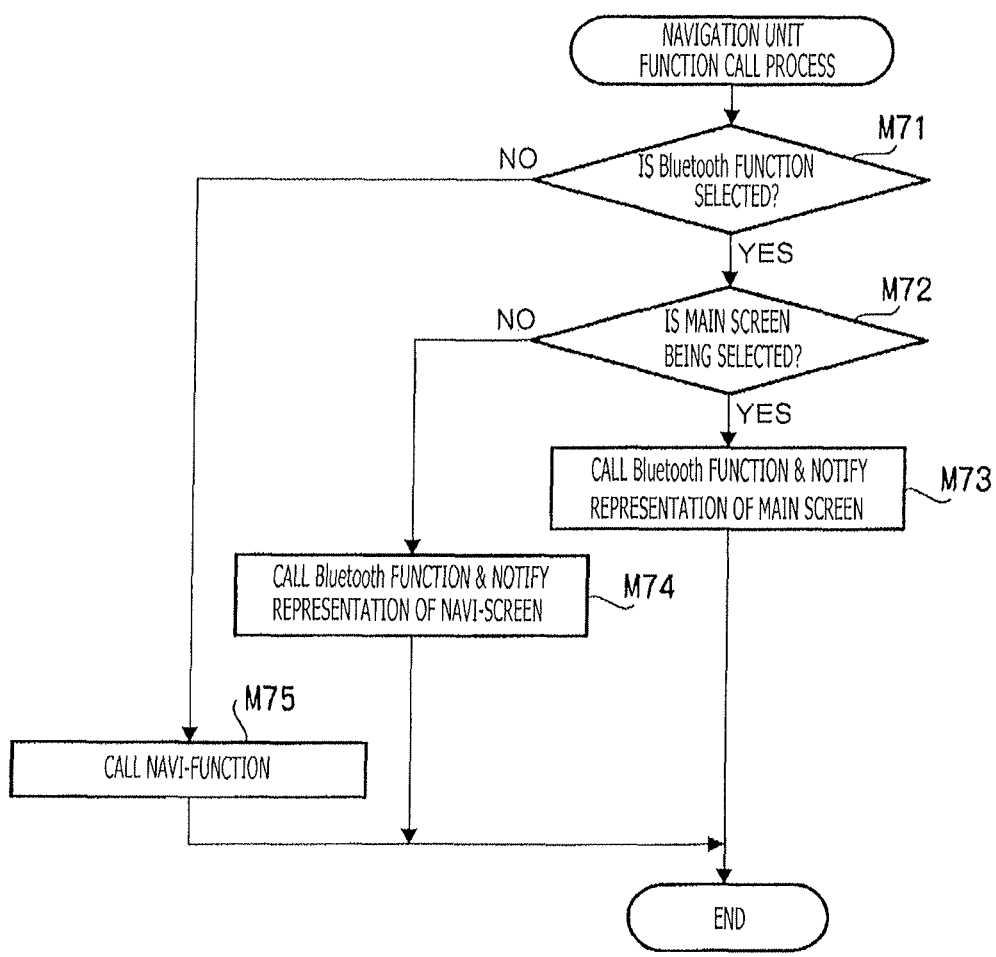
FIG. 3 is a flowchart illustrating details of a navigation unit function call process M7 in the flowchart of FIG. 2.
Figure 4:
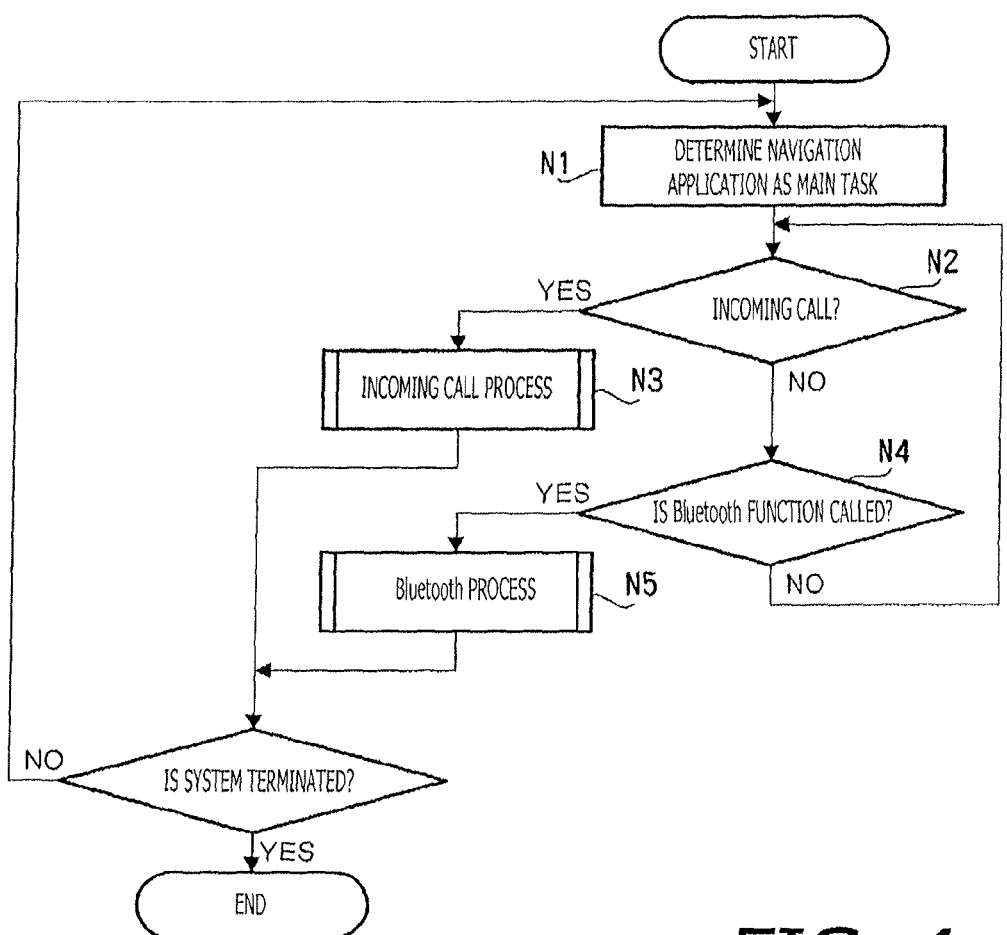
FIG. 4 is a flowchart illustrating a process regarding the onscreen representation executed by a navigation unit in the in-vehicle information apparatus according to the first embodiment of the invention.
Figure 5:
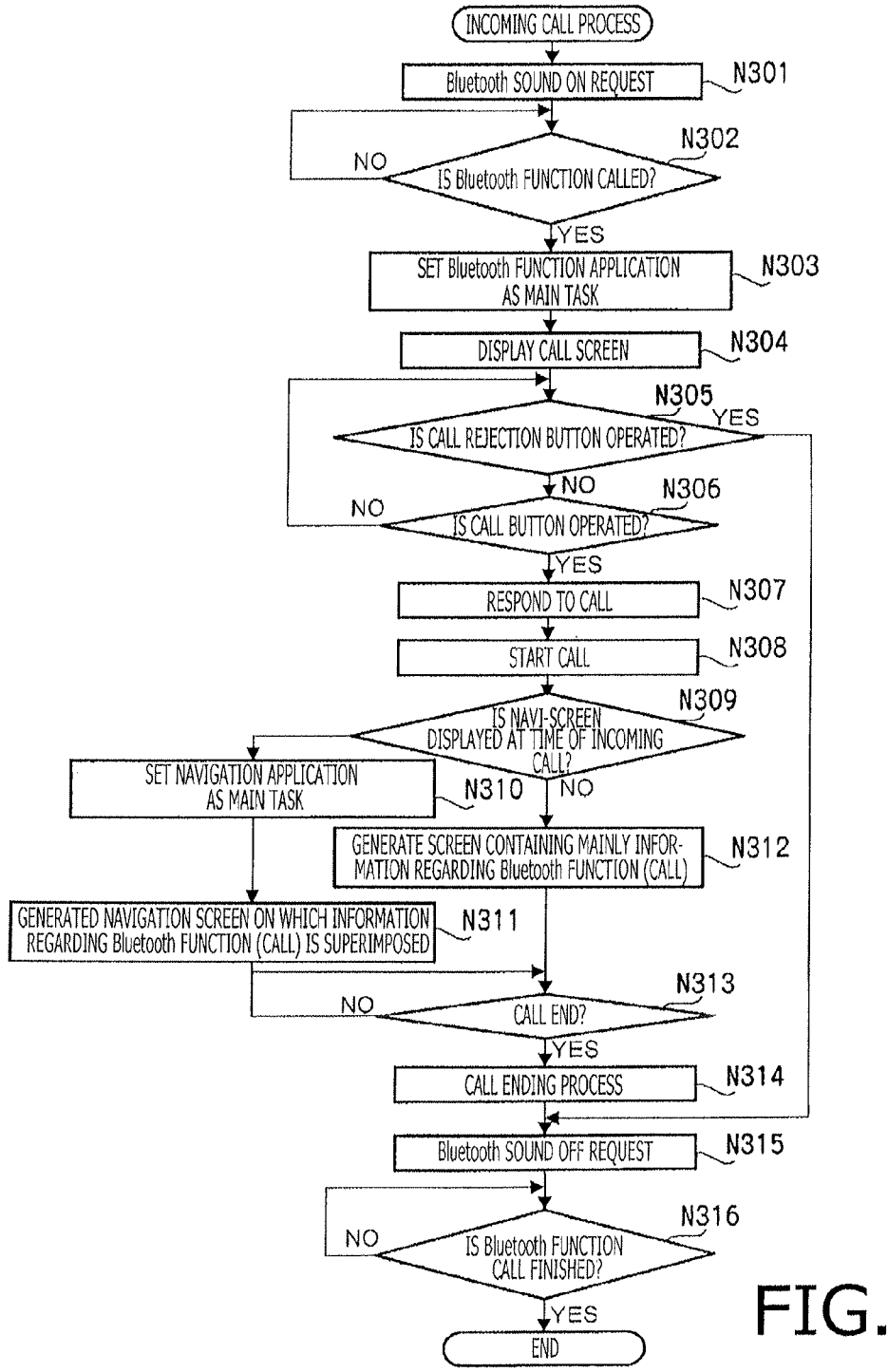
FIG. 5 is a flowchart illustrating an incoming call process N3 in the flowchart of FIG. 4.
Figure 6:
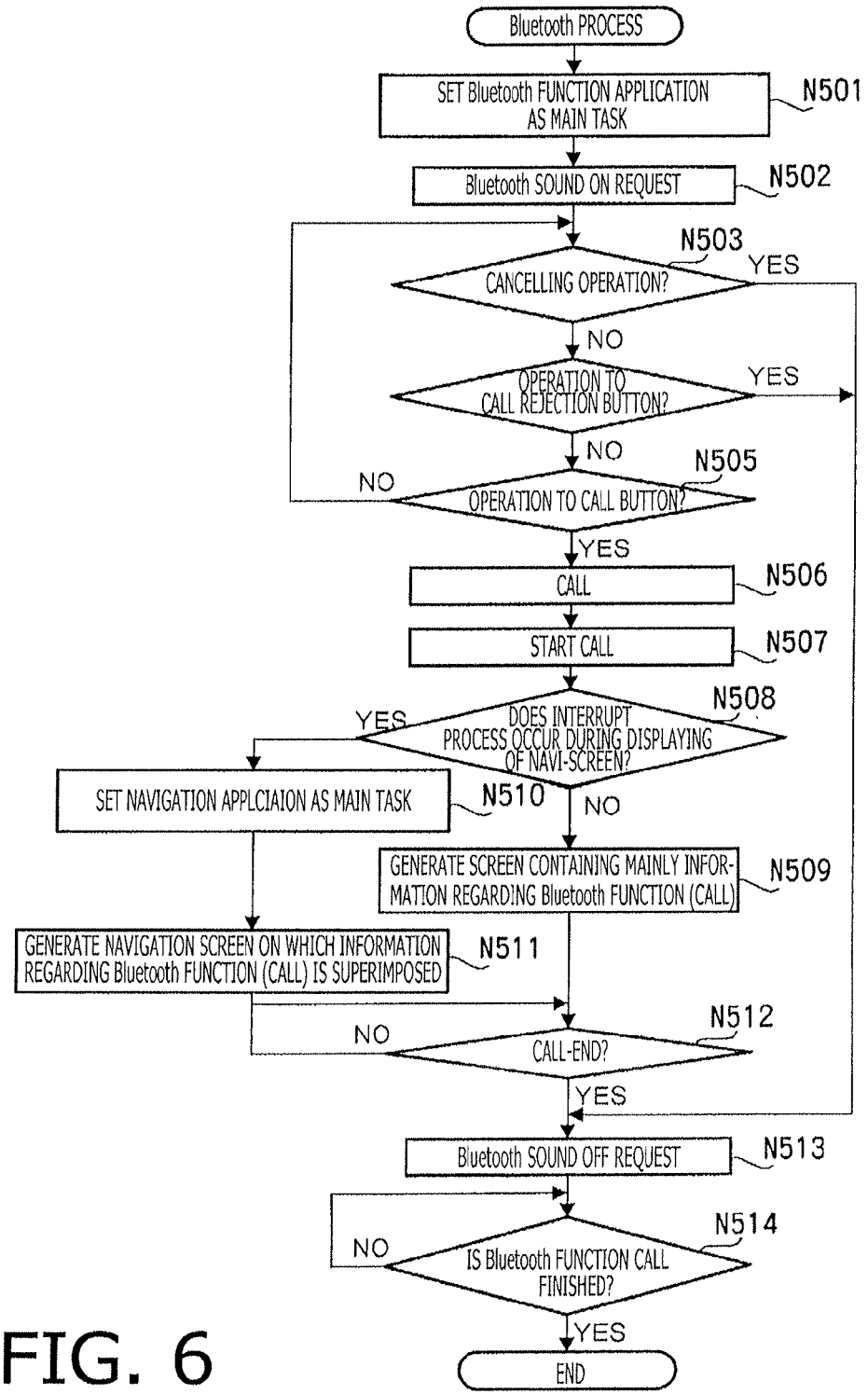
FIG. 6 is a flowchart illustrating a Bluetooth process N5 in the flowchart of FIG. 4.
Figure 7:
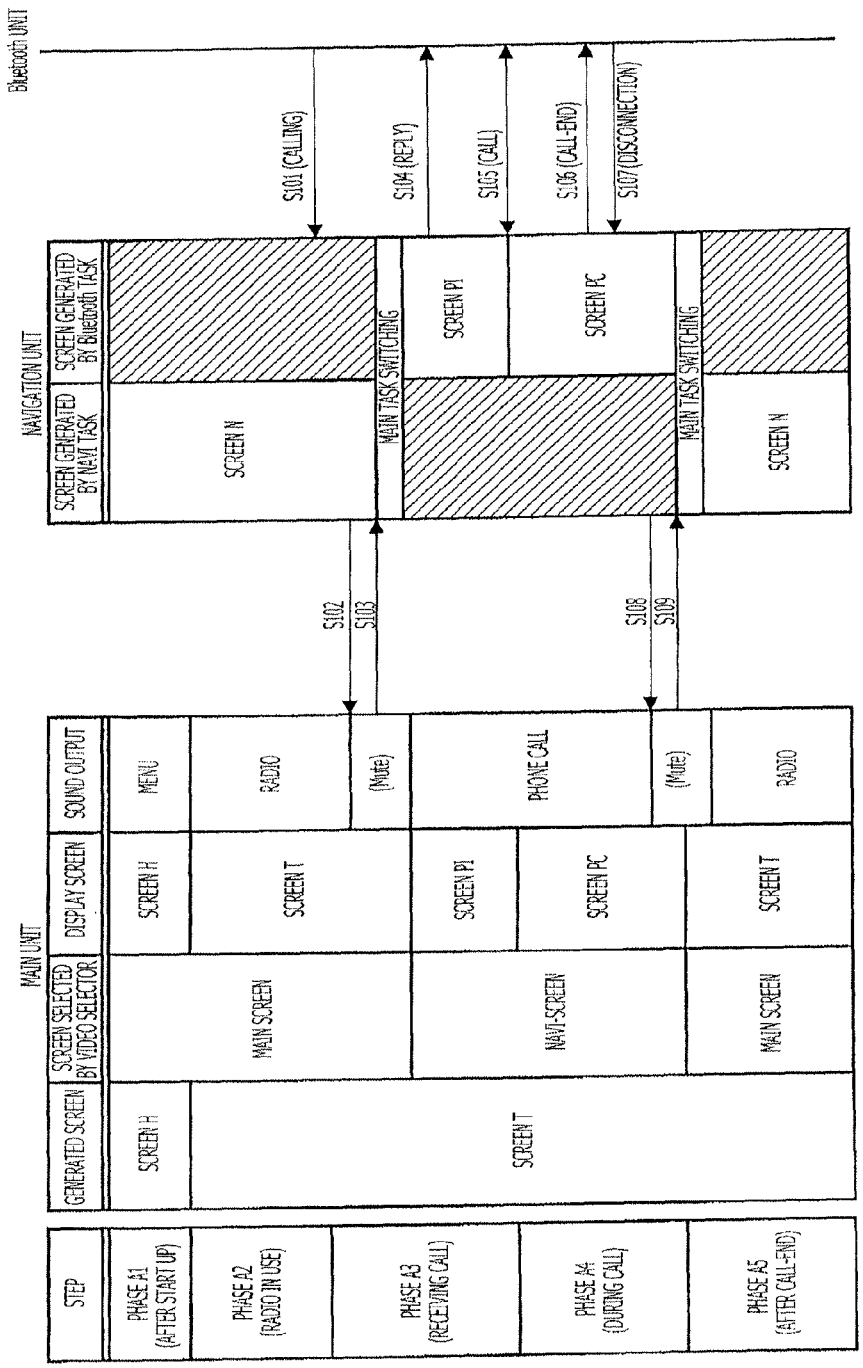
FIG. 7 is a sequence chart illustrating a control sequence and screen transition executed when an incoming call is received during displaying of a main unit screen in the in-vehicle information apparatus according to the first embodiment of the invention.
Figure 13:
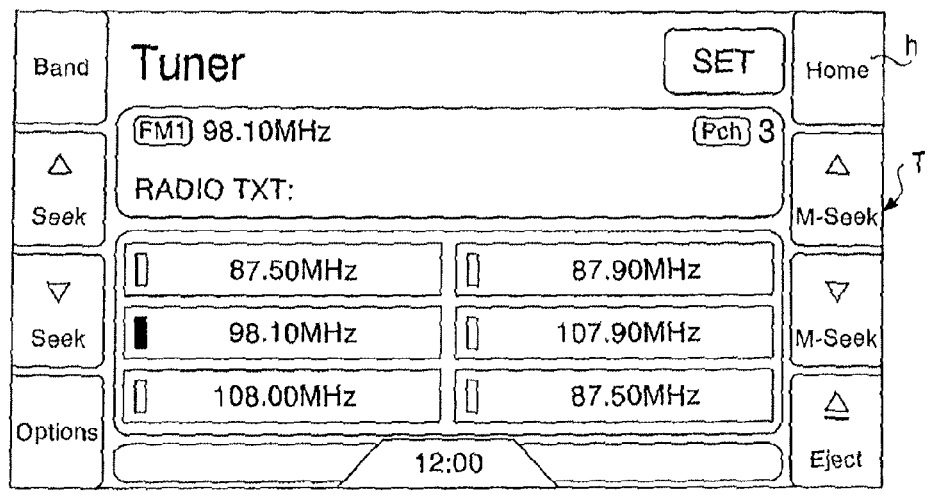
FIG. 13 illustrates an example of a radio function selection screen T displayed when a radio function is mainly used.

First, a process to be executed when a Bluetooth interruption process occurs during displaying of the main unit screen is explained with reference to flowcharts of FIGS. 2 to 5 and a sequence chart of FIG. 7. FIG. 2 is a flowchart illustrating a process executed by the main unit 100. FIG. 3 is a flowchart illustrating details of a navigation unit function call process M7 in the flowchart of FIG. 2. FIG. 4 is a flowchart illustrating a process executed by the navigation unit 200. FIGS. 5 and 6 are flowcharts illustrating an incoming call process N3 and a Bluetooth process N5 in the flowchart of FIG. 4. FIG. 7 is a sequence chart illustrating a control sequence executed between the navigation unit 200, the main unit 100 and the Bluetooth unit 300 when a Bluetooth interruption process occurs during displaying of a radio reception screen T (FIG. 13). In the sequence chart shown in FIG. 7, transition regarding the screens generated by the navigation unit 200 and the main unit 100, the screen selected by the video signal selector 130, the screen displayed on the display device 140 and the sound outputted through the speaker 150 is illustrated. In each of the flowcharts, the sequence chart and the following explanations, the main unit screen is abbreviated as "main screen", the sound generated by the main unit 100 is abbreviated as "main sound", the navigation unit screen is abbreviated as "navi-screen" and the sound generated by the navigation unit 200 is abbreviated as "navi-sound".

<Phase A1>

Figure 14:
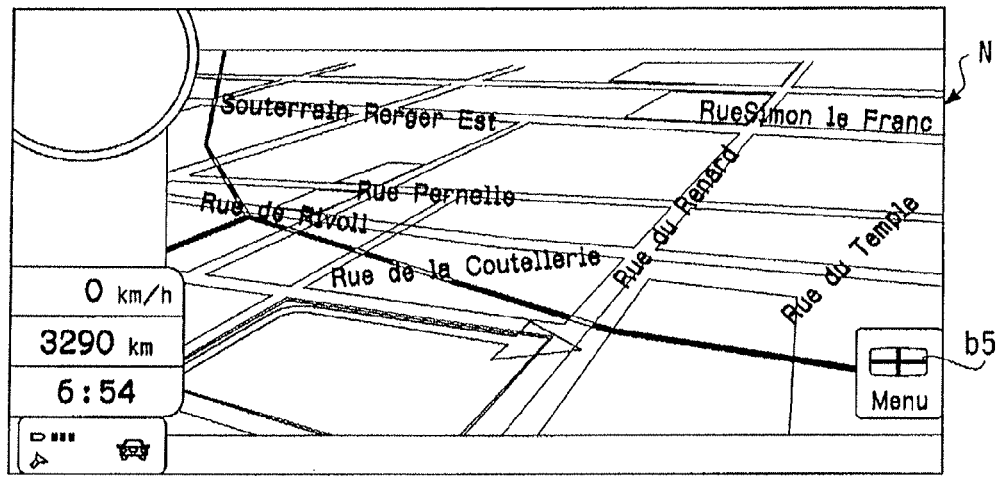
FIG. 14 illustrates an example of a normal navigation screen N displayed when a car navigation function is used.

When the in-vehicle information apparatus 1 starts up, the control unit 11 selects the main screen and the main sound (FIG. 2/process MD by controlling the video signal selector 130. Next, the control unit of the main unit 100 generates a home screen H (FIG. 12) including a function selection button for selecting the function to be used by a user and corresponding main sound (process M2). The control unit 210 of the navigation unit 200 sets the navigation application as a main task (FIG. 4/process N1), and generates a navigation screen N to be displayed in a normal state (a state where no interruption process occurs) by controlling the video signal generating unit 230. The navigation screen N illustrated in FIG. 14 is an example of the navigation screen which the navigation unit 200 generates in a normal state where no interruption process occurs. Since the main screen and the main sound are selected by the video signal selector 130 when the in-vehicle information apparatus 1 starts up, the home screen H is displayed on the display device 140, and sound regarding the menu function is outputted through the speaker 150.

<Phase A2>

When the user touches a radio function selection button b1 on the home screen H (FIG. 12) (M3: YES, M4: NO), the main unit 100 generates the radio reception screen T (FIG. 13) corresponding to the selected radio reception function (M5). Since the functions provided by the main unit are used subsequently, the video signal selector 130 also selects subsequently the main screen and the main sound (M6). As a result, the radio reception screen T is displayed on the display device 140, and the radio sound is outputted through the speaker. At this time, the main unit 100 does not notify the navigation unit 200 of the fact that the function selection operation by the user is conducted, and the navigation unit 200 successively displays the normal navigation screen (FIG. 14).

<Phase A3>

When an incoming call arrives at the mobile phone 2, and a call signal is transmitted from the mobile phone 2 to the Bluetooth unit 300 via a Bluetooth wireless link, the Bluetooth unit 300 transfers the call signal S101 (FIG. 7) to the control unit 210 of the navigation unit 200. When the navigation unit 200 receives the call signal S101 (FIG. 4/N2: YES), the navigation unit 200 starts the incoming call process N3. In the incoming call process N3, first, the navigation unit 200 transmits a Bluetooth sound ON request S102 requesting start of speaker output of sound regarding the Bluetooth communication function to the main unit 100 (FIG. 5/N301). When the main unit 100 receives the Bluetooth sound ON request S102 (M3: NO, M8: YES), the main unit 100 transmits a task switch command S103 for switching the main task to the Bluetooth application to the navigation unit 200 (M9). The task switch command S103 includes a notification for notifying that the main screen is selected by the video signal selector 130, i.e., a request for generating a screen not containing information (at lease as a main part) regarding the navigation function during an interruption process. When receiving the Bluetooth sound ON request S102, the main unit 100 immediately mutes the sound signal outputted from the video signal selector 130, and controls the video signal selector 130 to switch to the navi-screen and the navi-sound (telephone sound) after a predetermined time (M10).

When receiving the task switch command S103 (FIG. 5/N302: YES), the navigation unit 200 sets the Bluetooth application as a main task (N303), and an incoming call screen PI (FIG. 15) is generated and outputted to the main unit 100 by the Bluetooth application (N304). After transmitting the task switch command S103, the main unit 100 switches the selection by the video signal selector 130 to the navi-screen and the navi-sound, and releases the sound mute. Therefore, in this case, the incoming call screen PI generated by the navigation unit 200 is displayed on the display device 140, and the voice communication sound of the mobile phone is outputted through the speaker 150.

The incoming call screen PI is for notifying the user of the incoming call on the mobile phone 2 (i.e., an occurrence of a Bluetooth interruption process). In the incoming call screen PI, a name ("Name") and a phone number ("Number") of a caller are displayed, for example. These pieces of information are registered in a telephone book database stored on the mobile phone 2, and are transmitted from the mobile phone 2 to the navigation unit 200 via a Bluetooth wireless link together with a call signal. Alternatively, the telephone book database may be transmitted in advance from the mobile phone 2 to the in-vehicle information apparatus 1, and may be stored in a storage unit in the navigation unit 200. In the incoming call screen PI (FIG. 15), representation of a call start button b6 and an incoming call rejection button b7 is included. While the Bluetooth interruption process continues (phase A3, A4), the video signal selector 130 is controlled to constantly select the navi-screen, and the navi-screen is continuously displayed on the display device 140 (see FIG. 7). When a Bluetooth interruption process occurs, the video signal selector 130 is switched so that the navi-screen is displayed on the display device 140. However, the video signal generating unit 120 of the main unit continues to generate the radio reception screen T as in the case of occurrence of the interruption process (Phase A2) until the Bluetooth interruption process terminates.

When the call start button b6 is touched on the incoming call screen PI (FIG. 15) (FIG. 5/N305: NO, N306: YES), the control unit 210 of the navigation unit transmits an incoming call reply request S104 (FIG. 7) to the Bluetooth unit 300 (N307), and the Bluetooth unit 300 transfers it to the mobile phone 2 and a call is started (N308).

When the incoming call rejection button b7 is touched on the incoming call screen PI (FIG. 15) (FIG. 5/N305: YES), the process of the navigation unit 200 proceeds to N315 and N316 and the interruption process terminates. The processes N315 and N316 are explained later.

<Phase A4>

When a call S105 is started, then the navigation unit 200 starts to generate a screen to be displayed during the call. Since in this case it is required, in the task switch command S103, to generate a screen not containing the information regarding the navigation function (S309: NO), the Bluetooth application is set as a task as it is, and a call screen PC (FIG. 16) representing mainly the information regarding the Bluetooth (call) function is generated (N312). In the call screen PC, a call time ("Call Time") and an indicator of intensity of a received radio wave (antenna mark a) as well as a name ("Name") and a phone number ("Number") of a caller are displayed. Furthermore, in the call screen PC (FIG. 16), a call-end button b8 is displayed.

The in-vehicle information apparatus 1 according to the embodiment of the invention determines a screen to be displayed during a call in accordance with a screen which was displayed when the Bluetooth interruption process was processed (i.e., the function mainly used by the user when an incoming call is received). In this case, since the screen displayed when an incoming call is received on the mobile phone 2 is not the navigation screen N (FIG. 14) but is the radio reception screen T (FIG. 13), it can be judged that the user does not strongly require the navigation information. Therefore, the necessity for displaying the navigation information is low. Rather, there is a high possibility that displaying the navigation information all of a sudden may give uncomfortable felling to the user. On the other hand, providing the information regarding a call to the user during a call meets the need of the user, and does not give an uncomfortable feeling to the user. Therefore, when the main unit screen was displayed at the time of occurrence of an Bluetooth interruption process, i.e., when the navigation function was not mainly used at the time of occurrence of an interruption process, the in-vehicle information apparatus 1 according to the embodiment displays, during the call, the call screen PC (FIG. 16) containing mainly the information relating to the call. Such a configuration makes it possible to display, during the call, information which meets the need of the user, and does not give an uncomfortable feeling to the user.

<Phase A5>

When the user touches the call-end button b8 on the call screen PC (FIG. 16) (N313: YES), the navigation unit 200 transmits a call-end signal S106 (FIG. 7) to the Bluetooth unit 300 (N314). After the Bluetooth unit 300 transfers the call-end signal S106 to the mobile phone 2, a disconnection signal S107 is returned from a destination, and the mobile phone line is disconnected. When the disconnection signal S107 is transferred from the Bluetooth unit 300, the navigation Unit 200 transmits a Bluetooth sound OFF request S108 requesting termination of the sound output regarding the Bluetooth function, to the main unit 100 (N315). When receiving the Bluetooth sound OFF request S108 (FIG. 2/M3-M8: NO, M11:YES), the main unit 100 immediately mutes the sound signal outputted from the video signal selector 130, and transmits a task switch command S109 for switching the main task to the navigation application to the navigation unit 200 (M12). When receiving the task switch command S109 (N316: YES), the process of the navigation unit 200 returns to N1, and the navigation application is set as the main task again. Next, the main unit 100 controls the video signal selector 130 to switch the sound to be outputted to the speaker 150 to the main sound (M13), and controls the video signal selector 130 to switch to the screen which was displayed at the time of occurrence of the Bluetooth interruption process after a predetermined time elapses from the time of reception of the Bluetooth sound OFF request S108. Since in this case the main screen was displayed at the time of occurrence of the interruption process (M14: YES), the screen which the video signal selector 130 selects is switched to the main screen (M15). As described above, the screen which the main unit 100 generates is not changed during the Bluetooth interruption process, the radio reception screen T (FIG. 13) which was displayed at the time of occurrence of the Bluetooth interruption process is displayed on the display device 140. That is, the onscreen representation returns to a state of reception of the incoming call.

The aforementioned explanation is the process regarding the onscreen representation executed when the Bluetooth interruption process occurs during displaying of the main screen.

Figure 8:
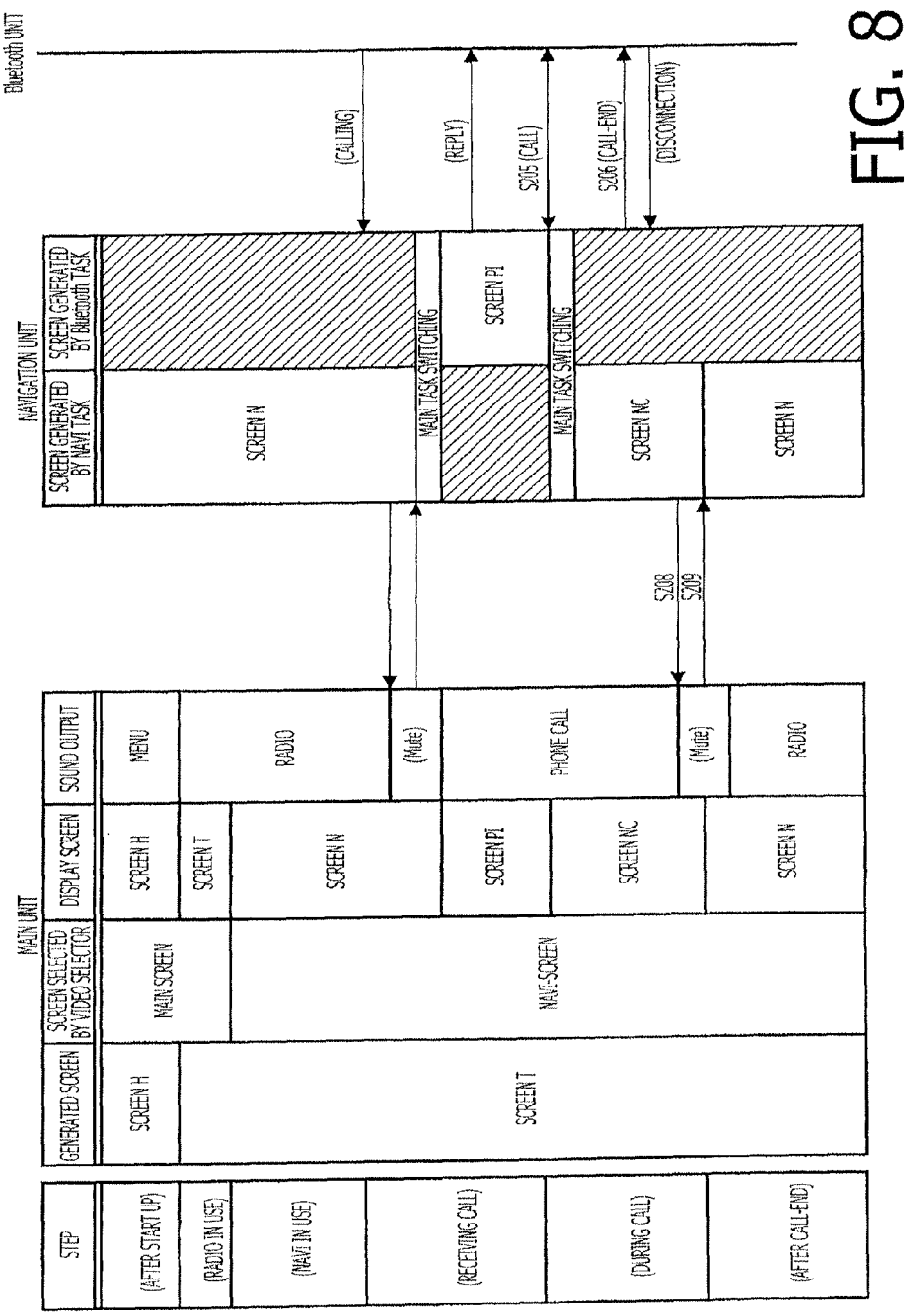
FIG. 8 is a sequence chart illustrating a control sequence and screen transition executed when an incoming call is received during displaying of a navigation screen in the in-vehicle information apparatus according to the first embodiment of the invention.

Next, a process regarding the onscreen representation executed when a Bluetooth interruption process occurs during displaying of the navi-screen is explained with reference to the flowcharts of FIGS. 2 to 5 and a sequence diagram of FIG. 8. In the following, the explanation focuses on the points different from the process executed when the interruption process occurs during displaying of the main unit screen, to avoid duplication of explanations.

<Phase B2>

When the user touches a navigation function selection button b2 on the home screen H (FIG. 12) (FIG. 2/M3: YES, M4: YES), a navigation unit function call process M7 is executed. In the navigation unit function call process M7, since the navigation function is selected (i.e., the Bluetooth interruption process does not occur) (FIG. 3/M71: NO), the navigation function is called (M75). Furthermore, the control unit 110 of the main unit 100 executes the navigation unit function call process M7, and switches the screen which the video signal selector 130 selects, to the navi-screen. Therefore, the normal navigation screen N is displayed on the display device 140.

<Phase B4>

When a Bluetooth interruption process occurs during displaying of the navi-screen, the process similar to the above described phase A3 is executed, and the incoming call screen PI (FIG. 15) is displayed. The video signal selector 130 continuously selects the navi-screen.

When the incoming call rejection button b7 is touched on the incoming call screen PI (FIG. 5/N305: YES), the process of the navigation unit 200 returns to N1 (FIG. 4) and the normal navigation screen N (FIG. 14) is generated after executing the communication S208 (N315) and S209 (M12). Furthermore, the control unit 110 of the main unit 100 controls the video signal selector 130 to return to the screen (the navi-screen) which was selected at the time of occurrence of the Bluetooth interruption process (M14: NO, M16). Therefore, the video signal selector 130 successively selects the navi-screen. Therefore, the normal navigation screen N which was displayed at the time of occurrence of the Bluetooth interruption process is displayed on the display device 140. That is the onscreen representation returns to the state of reception of the incoming call.

Figure 16:
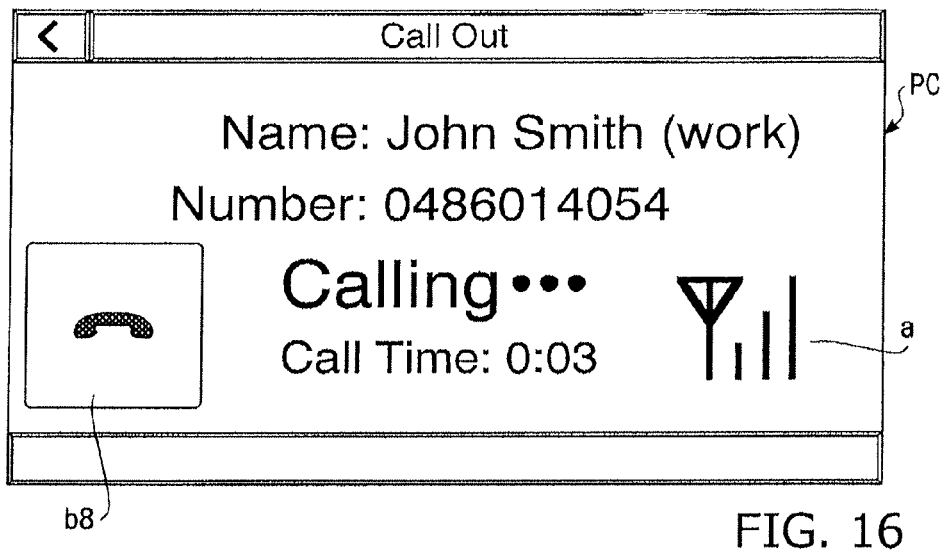
FIG. 16 is an example of a call screen PC displayed during a call when an incoming call is received during displaying of the main unit screen.
Figure 17:
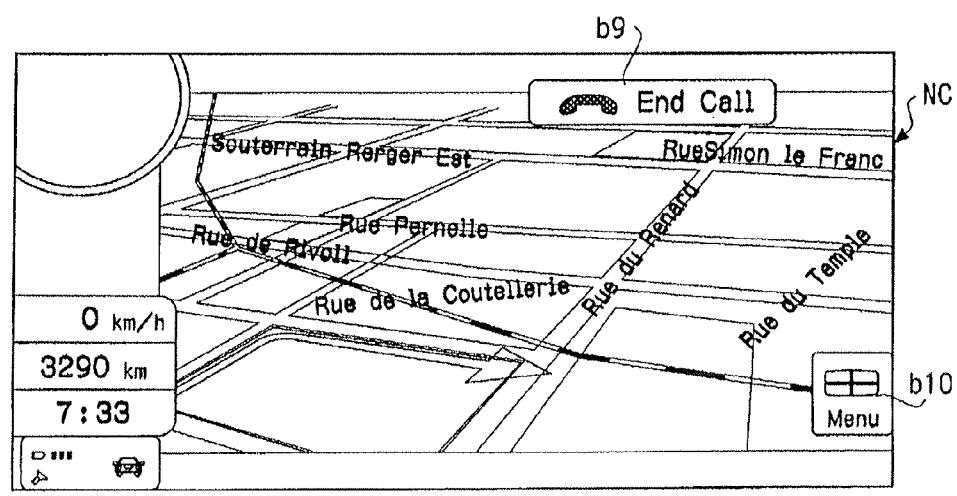
FIG. 17 is an example of a line-busy navigation screen NC displayed during a call.

When the user touches the call start button b6 on the incoming call screen PI (FIG. 15) (FIG. 5/N305: NO, N306: YES), the call is started (N307, N308), and the screen generated by the navigation unit 200 changes to the screen appropriate for presentation during the call. In this case, since the navi-screen was displayed at the time of occurrence of the Bluetooth interruption process (FIG. 3/M72: NO), the task switch command S103 outputted in the process M74 contains the notification notifying that the navi-screen is selected by the video signal selector 130, i.e., a request for generating a screen including mainly the information regarding the navigation function during the interruption process (FIG. 5/N309: YES). Therefore, when the call S205 is started, the navigation unit 200 sets the navigation application as the main task (N310), and the process N311 for generating a line-busy navigation information screen NC (FIG. 17) containing mainly the navigation information is executed. The line-busy navigation screen NC is a screen where a small call-end icon b9 is superimposed at the upper right position of the navigation screen N (FIG. 14). The call-end icon b9 is assigned the same function as that of the call-end button b8 on the call screen PC (FIG. 16).

Since the navigation screen N was displayed at the time of reception of the incoming call on the mobile phone 2, it can be judged that the user strongly wants the information regarding the navigation function. Although all the information displayed on the incoming screen PC (FIG. 16) generated in the process N312 are information contributing to convenience for the user, the onscreen representation during the call is not essential excepting the call-end button b8. Therefore, when the navigation screen was displayed at the time of reception of an incoming call, it is considered that displaying the screen mainly including the information regarding the navigation function meets the user's need. Furthermore, such onscreen representation does not give uncomfortable feeling to the user. Accordingly, when the navi-screen was displayed at the time of reception of an incoming call, the in-vehicle information apparatus 1 according to the embodiment of the invention displays the line-busy navigation screen NC (FIG. 17) during the call.

<Phase B5>

When the user touches the call-end button b9 displayed small at the upper right position on the line-busy navigation screen NC (N313: YES), the process of the navigation unit 200 returns to N1 and the normal navigation screen N (FIG. 14) is generated again after execution of the call-end process S206, S207 (N314) and the communication S208 (N315), S209 (M12) with the main unit 100. Since the navi-screen was displayed at the time of occurrence of the Bluetooth interruption process, the control unit 110 of the main unit 100 controls the video signal selector 130 to successively select the navi-screen. As a result, the normal navigation screen N which was displayed at the time of occurrence of the interruption process is displayed on the display device 140. That is, the onscreen representation returns to the state of reception of the incoming call.

The aforementioned explanation is the process regarding the onscreen representation executed when the Bluetooth interruption process occurs during displaying of the navi-screen.

Although the above described process corresponds to the case where the Bluetooth interruption process occurs due to an incoming call on the mobile phone 2, the screen transition also occurs in accordance with occurrence of the Bluetooth interruption process when the user initiates an outgoing call on the mobile phone 2. The in-vehicle information apparatus 1 according to the embodiment realizes the screen transition which meets the user's need and does not give uncomfortable feeling to the user, by determining and displaying the screen to be generated during the call (during the Bluetooth interruption process) in accordance with the screen which was displayed on the display device 140 at the time of initiating of the outgoing call, also in the Bluetooth interruption process occurring due to the outgoing call.

Next, the process regarding the onscreen representation executed when the user initiates an outgoing call from the mobile phone 2 which is connected by wireless to the Bluetooth unit 300 to another mobile phone and a Bluetooth interruption process occurs on the in-vehicle information apparatus 1 is explained.

Figure 9:
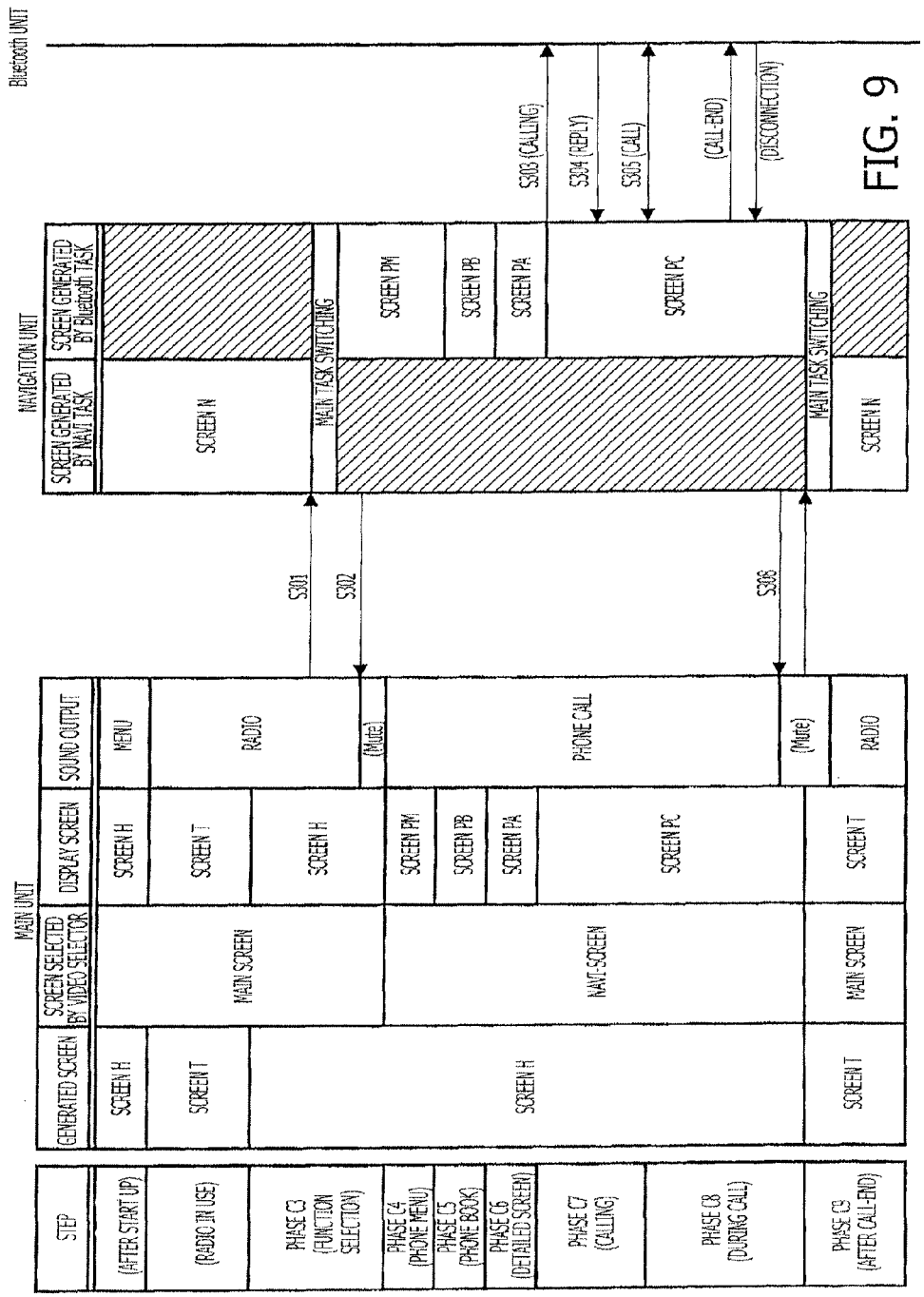
FIG. 9 is a sequence chart illustrating a control sequence and screen transition executed when an outgoing call is initiated during displaying of the main unit screen in the in-vehicle information apparatus according to the first embodiment of the invention.

First, the process executed when the Bluetooth interruption process occurs during displaying of the main screen is explained with reference to the flowcharts of FIGS. 2 to 4 and 6 and a sequence diagram of FIG. 9. The following explanation is given by taking the case where an outgoing call is initiated from the mobile phone 2 through the handsfree function during displaying of the radio reception screen T (FIG. 13). In the following, the explanation focuses on the points different from the above described process executed when the interruption process occurs due to reception of an incoming call, to avoid duplication of explanations.

<Phase C3>

Figure 12:
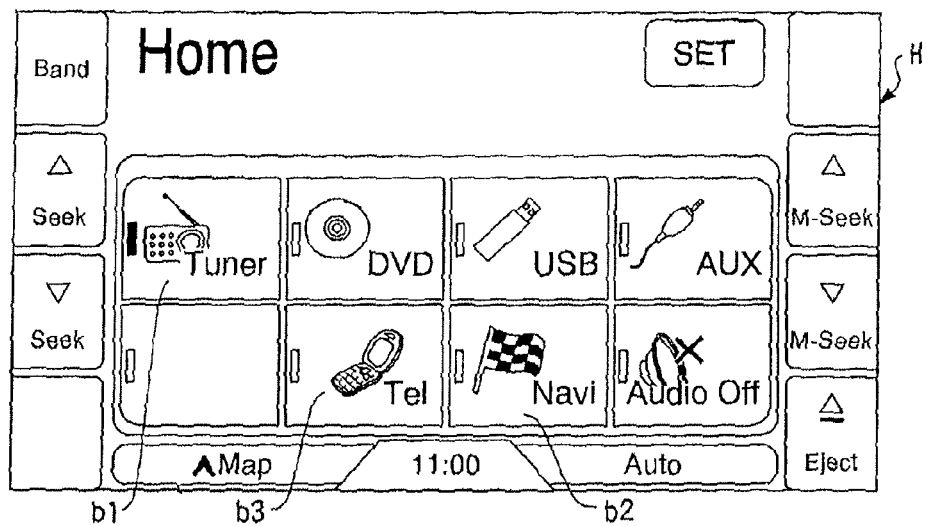
FIG. 12 illustrates an example of a function selection screen (a home screen H).

A Home button h for switching to the home screen H (FIG. 12) is displayed at the upper right position on the radio reception screen T (FIG. 13). The home screen H is used by the user to use the menu function provided by the main unit 100. That is, when the Home button h is touched on the radio reception screen T (FIG. 2/M3: YES), the menu function provided by the main unit 100 is selected (M4: NO), and the screen generated by the video signal generating unit 120 of the main unit 100 is switched from the radio reception screen T to the home screen H (M5). Furthermore, the video signal selector 130 successively selects the main screen and the main sound (M6), and the home screen H is displayed on the display device 140. As shown in FIG. 12, the home screen H contains a call function selection button b3 for selecting the handsfree communication function using the mobile phone 2 connected via Bluetooth with the in-vehicle information apparatus 1.

<Phase C4>

When the user touches the call function selection button b3 on the home screen H (M3: YES), the handsfree function provided by the navigation unit 200 is selected (M4: YES), and in this case the Bluetooth interruption process occurs and the process of the main unit 100 moves to the navigation unit function call process M7. Since in this case the handsfree function corresponding to the Bluetooth function is selected (FIG. 3/M71: YES), the process of the main unit 100 proceeds to M72. Since in this case the user starts the calling operation for the handsfree function (Bluetooth function) while the radio reception screen T (FIG. 13) is displayed, i.e., while the video signal selector 130 selects the main screen (M72: YES), the process of the main unit 100 proceeds to M73. In the process M73, a call for the Bluetooth function, i.e., a task switch command S301 instructing to switch the main task to the Bluetooth application, is transmitted to the navigation unit 200. The task switch command S301 includes a notification notifying that the main screen is being selected by the video signal selector 130, i.e., a request for generating the screen which does not mainly include information regarding the navigation function during the interruption process.

Figure 18:
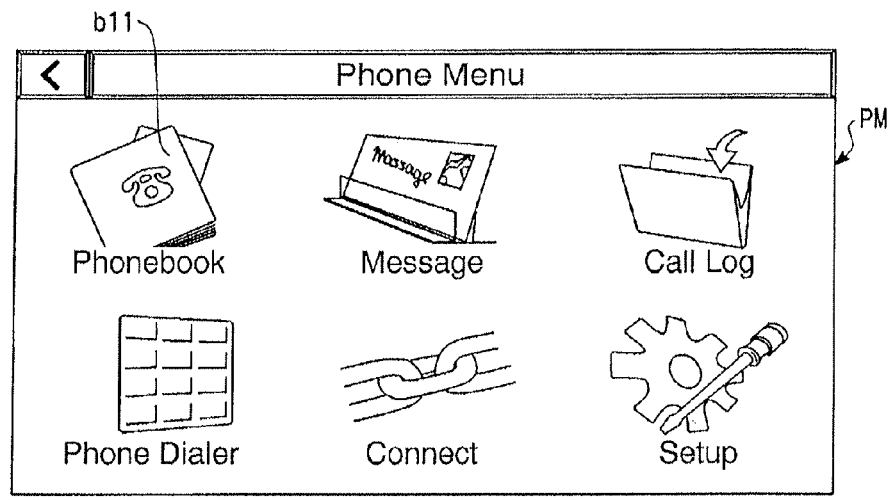
FIG. 18 is an example of a telephone menu screen PM which is a menu screen concerning a mobile phone function.

When receiving the task switch command S301 from the main unit 100; the navigation unit 200 judges that the Bluetooth interruption process is not caused by the incoming call (FIG. 4/N2: NO, N4: YES9) because in this case the navigation unit 200 does not receive the call signal from the Bluetooth unit 300 but receives the task switch command S301 from the main unit to the Bluetooth application, and the process proceeds to the Bluetooth process N5. In the Bluetooth process N5 shown in FIG. 6, first, the navigation unit 200 sets the Bluetooth application as the main task (N501), and transmits a Bluetooth sound ON request S302 requesting start of speaker output of the sound regarding the Bluetooth communication function, to the main unit 100 (N502). After the Bluetooth interruption process occurs, first, the Bluetooth application generates a telephone menu screen PM (FIG. 18).

When receiving the Bluetooth sound ON request S302, the main unit 100 immediately mutes the sound signal outputted from the video signal selector 130, and controls the video signal selector 130 to switch to the navi-screen and the navi-sound (telephone sound) in a predetermined time (M10). Then, the telephone menu screen PM is displayed on the display device 140. The video signal selector 130 successively selects until the navi-screen the Bluetooth interruption process is finished, and the navi-screen is displayed on the display device 140.

Figure 19:
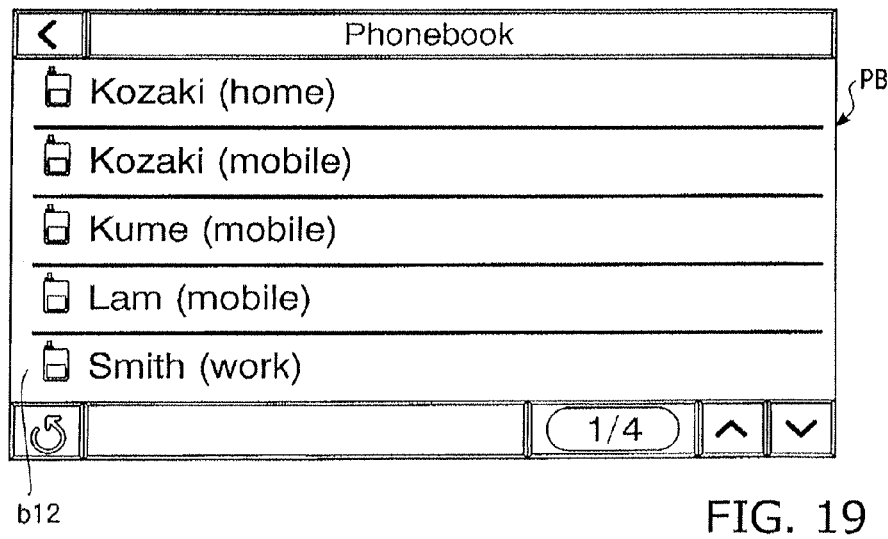
FIG. 19 is an example of a phonebook list screen PB.

The telephone menu screen PM (FIG. 18) contains a phonebook button b11 ("Phonebook") for changing the onscreen representation to a phonebook list screen PB (FIG. 19).

<Phase C5>

When the user touches the phonebook button b11 on the phonebook menu screen PM (FIG. 18), the screen generated by the navigation unit 200 is changed to the phonebook list screen PB. The phonebook list screen PB is a screen through which the user selects a party to which the user makes a call, and, for example, name information b12 of a plurality of records registered in the phonebook database is displayed as a list.

<Phase C6>

Figure 20:
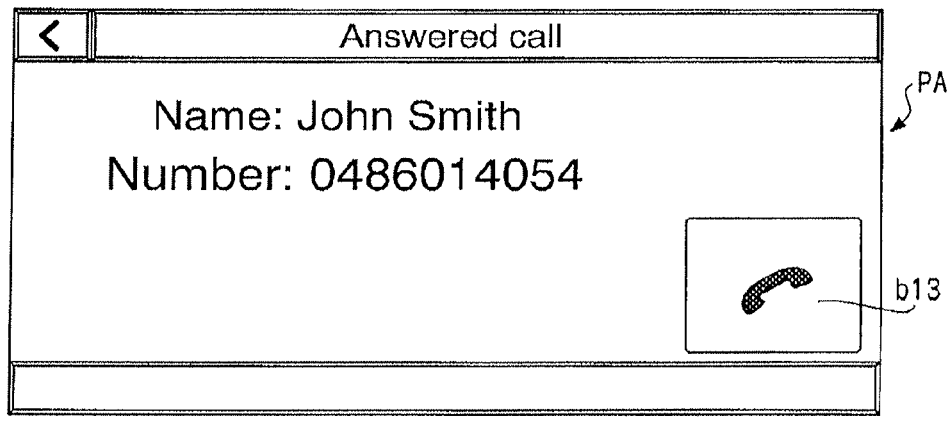
FIG. 20 is an example of a phonebook record detailed screen PA.

When the user touches one of pieces of name information b10 listed on the telephone list screen PB, the screen generated by the navigation unit 200 is changed to a phonebook record detailed screen PA (FIG. 20) corresponding to the touched name information b10, and is displayed on the display device 140. The phonebook record detailed screen PA is a screen displaying the detailed information of the record selected by the user, and contains detailed information, such as a name ("Name") and a phone number ("Number") of each record. The phonebook record detailed screen PA contains the call button b13 for making a call to the displayed phone number.

<Phase C7>

When the user touches the call button b11 on the phonebook record detailed screen PA (FIG. 20) (FIG. 6/N505: YES), the navigation unit 200 transmits the call signal S303 to the Bluetooth unit 300 (N506). When receiving the call signal S303, the Bluetooth unit 300 transfers it to the mobile phone 2. When receives a reply signal from the other party, the mobile phone 2 transmits a signal S304 informing reception of the reply signal to the Bluetooth unit 300, and the Bluetooth unit 300 transfers the signal S304 to the navigation unit 300, and a call S305 is started (N507).

<Phase C8>

In the next process N508, the navigation unit 200 determines the screen to be displayed during a call based on the screen displayed at the time of occurrence of the Bluetooth interruption process. As described above, since the task switch command S301 contains the notification notifying that the main screen has been selected by the video signal selector 130 at the time of occurrence of the Bluetooth interruption process (N508: NO), the navigation unit 200 generates the screen which mainly displays the information regarding the Bluetooth function (the handsfree communication function) (N509).

In this case, since the radio reception screen T (FIG. 13) which is the main screen not containing the information regarding the navigation function was displayed at the time of occurrence of the Bluetooth interruption process (i.e., when the user starts the operation for making a call), it can be judges that the user does not strongly want the navigation information. Therefore, when the main screen was displayed at the time of occurrence of the Bluetooth interruption function, the in-vehicle information apparatus 1 according to the embodiment of the invention displays the call screen PC (FIG. 16) containing mainly the information regarding the handsfree communication function during the call.

<Phase C9>

When the user touches the call-end button b8 on the call screen PC (N512: YES), the navigation unit 200 transmits a Bluetooth sound OFF request S308 requesting termination of the sound output regarding the Bluetooth communication function to the main unit 100 (N513). When receiving the Bluetooth sound OFF request S308, the main unit 100 immediately mutes the sound signal outputted from the video signal selector 130, and transmits a command S309 for switching the main task to the navigation application and terminating the Bluetooth interruption process, to the navigation unit 200 (M12). When the command S309 is received and the Bluetooth interruption process is finished (N514: YES), the process of the navigation unit returns to N1, sets the navigation application as the main task, and generates the normal navigation screen N again (FIG. 14).

When the Bluetooth interruption process terminates, the control unit 110 of the main unit 100 switches the sound selected by the video signal selector 130 to the main sound (M13). Next, the control unit 110 of the main unit 100 determines the screen to be displayed after termination of the Bluetooth interruption process based on the screen which was displayed at the time of the navi-sound ON request, i.e., at the time of occurrence of the Bluetooth interruption process. In this case, since the radio reception screen T which is the main screen was displayed when the user started the operation for selecting the handsfree communication function (M14: YES), the control unit 110 controls the video signal selector 130 to select the main unit screen (M15). As a result, the state returns to the state at the occurrence of the Bluetooth interruption process, i.e., the state defined when the user started the operation for making a call.

The aforementioned explanation is the process regarding the onscreen representation executed when the Bluetooth interruption process occurs due to the user operation (making a call).

Figure 10:
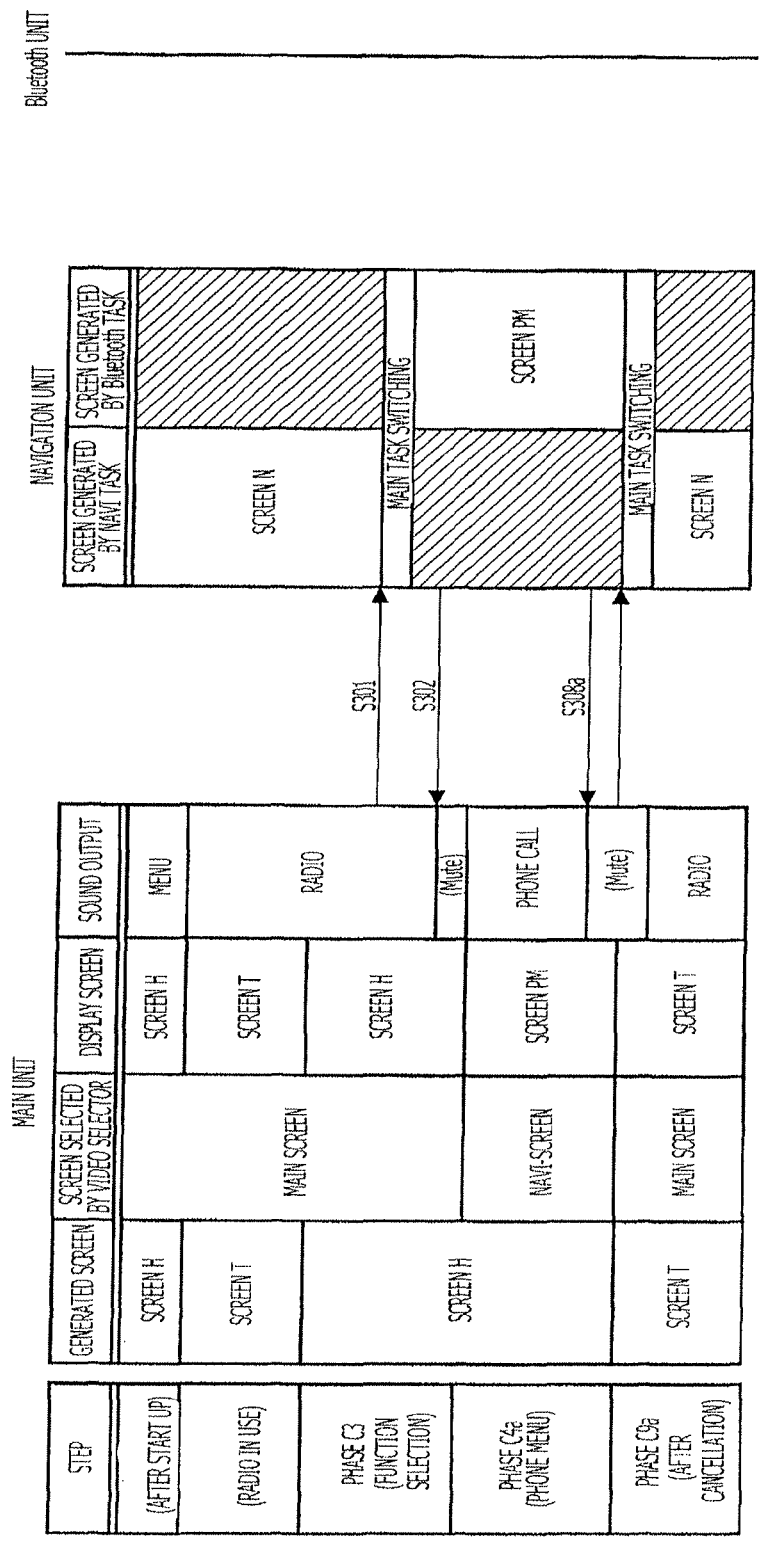
FIG. 10 is a sequence chart illustrating a control sequence and screen transition executed when the sequence for initiating an outgoing call during displaying of the main unit screen is stopped in the in-vehicle information apparatus according to the first embodiment of the invention.

Next, a process executed when a call is stopped in the middle of the above described process is explained with reference to the sequence diagram shown in FIG. 10. FIG. 10 is the sequence diagram executed when the call process is stopped during displaying of the telephone menu screen PM (FIG. 18).

<Phase C4a>

At the upper left position of the telephone menu screen PM, a "<" mark button for moving the screen back to the previous screen is displayed. When the user touches the "<" mark button two times continuously on the telephone menu screen PM, a process for moving the screen to the home screen H which is the second last screen and for terminating the Bluetooth interruption process is executed. Specifically, when the user touches the call-end button b8 two times continuously, the navigation unit 200 judges that an operation for cancelling the Bluetooth interruption process is conducted (N503: YES), and transmits a Bluetooth sound OFF request S308a for requesting termination of sound output regarding the Bluetooth communication function, to the main unit 100 (N513). When receiving the Bluetooth sound OFF request S308a, the main unit 100 immediately mutes the sound signal outputted from the video signal selector 130, and transmits a command S309 for switching the main task to the navigation application, to the navigation unit 200 (M12). Subsequently, a process similar to that of the Phase C9 shown in FIG. 9 is executed in Phase C9a, and the radio reception screen T which was displayed when the Bluetooth interruption process was caused by the user is displayed, and the radio sound is outputted through the speaker. As a result, the onscreen representation returns to the state defined when the user started the operation for making a call, i.e., when the Bluetooth interruption process occurred.

Figure 11:
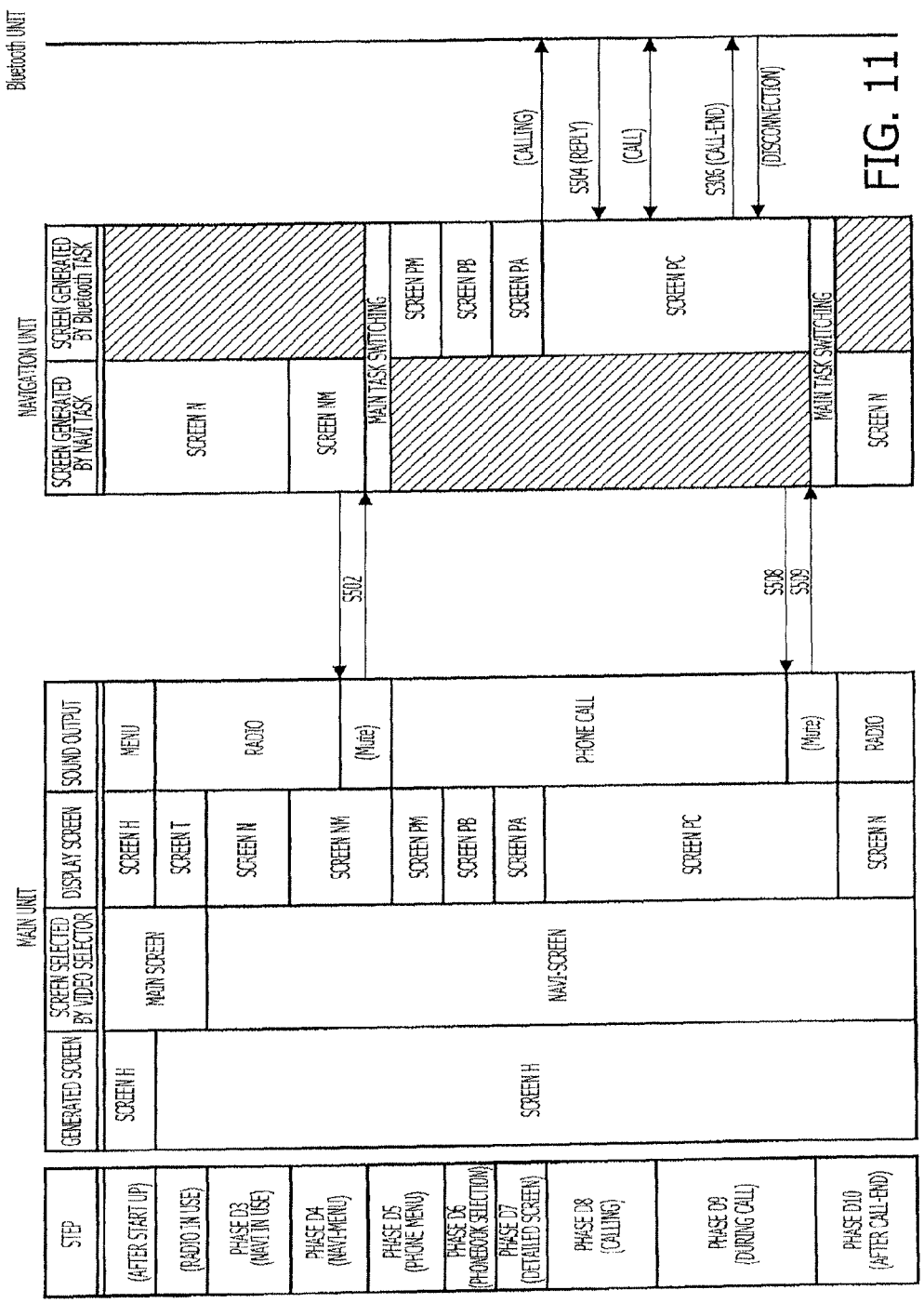
FIG. 11 is a sequence chart illustrating a control sequence and screen transition executed when an outgoing call is initiated during displaying of the navigation screen in the in-vehicle information apparatus according to the first embodiment of the invention.

Next, the screen transition caused when the Bluetooth interruption process is caused by the user is explained with reference to the flowcharts of FIGS. 2 to 4 and 6 and the sequence chard of FIG. 11. In the following, the explanation focuses on the points different from the process executed when the interruption process occurs during displaying of the main unit screen to avoid duplication of explanations.

<Phase D3>

Figure 21:
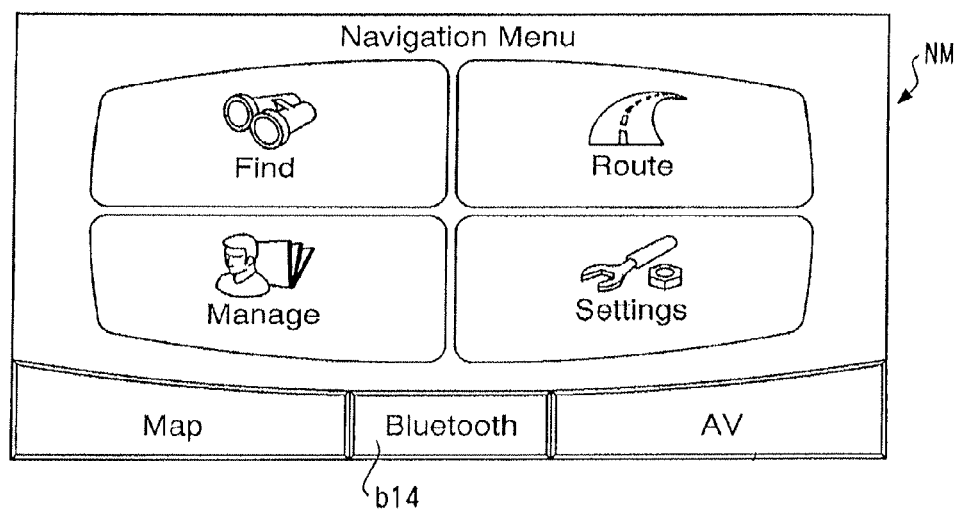
FIG. 21 is an example of a navigation menu screen NM.

At the lower right position of the normal navigation screen N (FIG. 14), a Menu button b5 for switching the onscreen representation to a navigation menu screen NM (FIG. 21) is displayed. When the Menu button b5 is touched, the screen generated by the navigation unit 100 is changed to the navigation menu screen NM (FIG. 21), and the navigation menu screen NM is displayed on the display device 140.

<Phase D4>

The navigation menu screen NM is a screen for selecting the function provided by the navigation module 200. At a lower central position of the navigation menu screen NM, a Bluetooth button b14 for selecting the Bluetooth function is displayed.

<Phase D5>

When the Bluetooth button b14 is touched, the screen generated by the navigation module 200 is changed to the telephone menu screen PM (FIG. 18). Furthermore, the navigation module 200 transmits a Bluetooth sound ON request. S502 for requesting start of speaker output of the sound regarding the Bluetooth function, to the main unit 100.

When receiving the Bluetooth sound ON request S502, the main unit 100 immediately mutes the sound signal outputted from the video signal selector 130, and controls the video signal selector 130 for switching to the navi-screen and the navi-sound (telephone sound) in a predetermined time. Then, the telephone menu screen PM is displayed on the display device 140.

<Phase D6>

When the user touches the phonebook button b11 on the telephone menu screen PM (FIG. 18), the screen generated by the navigation unit 200 is changed to the phonebook list screen PB (FIG. 19).

<Phase D7>

When the user touches one of the pieces of name information b12 displayed as a list on the phonebook list screen PB, the screen generated by the navigation unit 200 is changed to the phonebook record detailed screen PA corresponding to the touched name information b12, and is displayed on the display device 140.

<Phase D8>

When the user touches the call button b13 on the phonebook record detailed screen PA (FIG. 20) (FIG. 6/N505: YES) the call signal S502 and the replay signal S504 are transmitted between the navigation unit 200 and the Bluetooth unit 300, and the call S502 is started (N507)

<Phase D9>

In N508, the screen adapted to display during a call is determined in accordance with the screen which was displayed at the time of occurrence of the Bluetooth interruption. In this case, since the navigation screen N (FIG. 14) which is the navigation unit screen was displayed at the time of occurrence of the Bluetooth interruption process (i.e., when the user started the operation for making a call) (N508: YES), it can be judged that the user strongly wants the navigation information. Therefore, the navigation unit 200 sets the navigation application as the main task (N510) to generate the line-busy navigation screen NC during a call (N511).

When the user touches the call-end button b9 on the line-busy navigation screen NC (N512: YES), the navigation unit 200 transmits a Bluetooth sound OFF request S508 to the main unit 100 (n513). When receiving the Bluetooth sound OFF request S508, the main unit 100 immediately mutes the sound signal outputted from the video signal selector 130, and transmits the command S509 for switching the main task to the navigation supplication and for terminating the Bluetooth interruption process (M12).

<Phase D10>

When the navigation unit 200 receives the command S509 and the Bluetooth interruption process terminates (N514: YES), the process of the navigation unit 200 returns to N1, and the navigation application is set as the main task, and the normal navigation screen N (FIG. 14) is generated again.

Since the navi-screen was displayed at the time of occurrence of the Bluetooth interruption process (M14: NO), the control unit 110 of the main unit 100 controls the video signal selector 130 to successively select the navi-screen (M16). As a result, the normal navigation screen N which was displayed at the time of occurrence of the interruption is displayed on the display device 140. That is, the onscreen representation returns to the original state.

As described above, in the navigation unit 200 according to the embodiment, the navigation application for generating the onscreen representation and the sound regarding the navigation function and the Bluetooth program for generating the onscreen representation and the sound regarding the Bluetooth function are installed. And, the navigation unit 200 judges which of the navi-screen and the main screen was displayed at the time of occurrence of the Bluetooth interruption process, and switches the application program to be used, based on the judgment result. When the navi-screen was displayed at the time of occurrence of the Bluetooth interruption process, the line-busy navigation screen NC (FIG. 17) containing mainly the navigation information is generated using the navigation application. On the other hand, when the main screen was displayed at the time of occurrence of the Bluetooth interruption process, the call screen PC (FIG. 16) displaying mainly the information regarding the Bluetooth function (call) using the Bluetooth application program is generated. That is, since the navigation unit 200 is configured to generate the display screen during the call in response to the display screen at the time of occurrence of the Bluetooth interruption process, through cooperation with the main unit 100, it is possible to display a natural screen which does not give uncomfortable feeling to the user. Furthermore, when the Bluetooth interruption process terminates, the main unit 100 judges which of the navi-screen and the main screen was displayed at the time of occurrence of the Bluetooth interruption process, and moves the screen back to the one before occurrence of the Bluetooth interruption process. Such a configuration makes it possible to prevent a screen which is not intended by the user from being displayed in response to occurrence of the Bluetooth interruption process.

The foregoing explanation is the embodiment of the invention. The present invention is not limited to the above described embodiment, and can be varied within the scope of the technical concept of the invention. For example, in the embodiment, the navigation unit 200 judges which of the navi-screen and the main screen is displayed at the time of occurrence of the Bluetooth interruption, and switches the application program to be used, based on the judgment result, and generates the line-busy navigation screen NC (FIG. 17) or the call screen PC (FIG. 16). The present invention is not limited to such a configuration. The navigation unit 200 may be configured to inquire the main unit 100 about which of the navi-screen and the main screen is being displayed at the time of occurrence of the Bluetooth interruption. In the following, this configuration is explained as a second embodiment.

Figure 22:
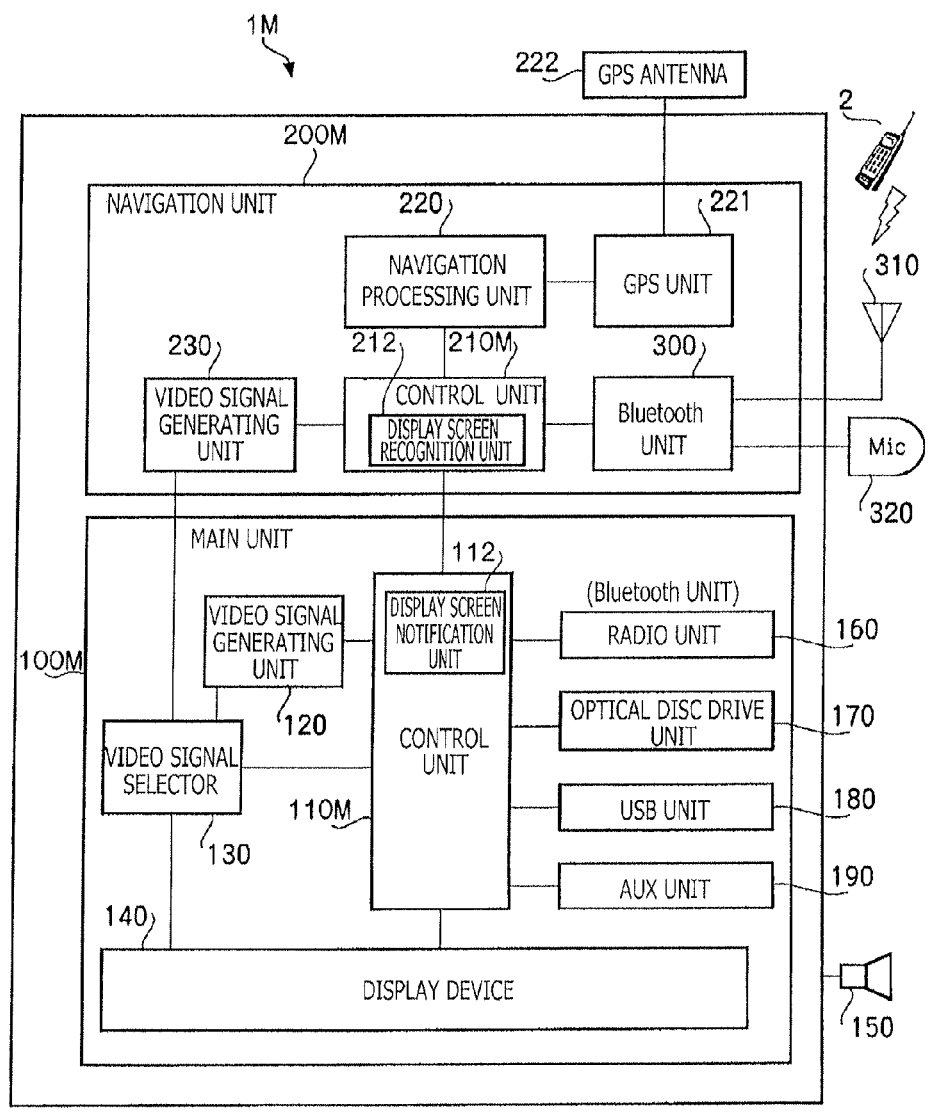
FIG. 22 is a block diagram generally illustrating a configuration of an in-vehicle information apparatus according to a second embodiment of the invention.

FIG. 22 is a block diagram illustrating a general configuration of an in-vehicle information apparatus 1M according to a second embodiment of the invention. As in the case of the first embodiment, the in-vehicle information apparatus 1M is a multifunctional in-vehicle information apparatus having various types of audio and video reproducing functions and a network communication function, in addition to the car navigation function. The in-vehicle information apparatus 1M is different from the in-vehicle information apparatus 1 according to the first embodiment in regard to the fact that a control unit 110M of a main unit 100M includes a display screen notification unit 112, and a control unit 210M of a navigation unit 200M includes a display screen recognition unit 212. As in the case of the first embodiment, the in-vehicle information apparatus 1M has the Bluetooth communication function which realizes the handsfree communication in cooperation with a mobile phone with a Bluetooth function. In FIG. 22, to elements which are the same as those of the in-vehicle information apparatus 1 according to the first embodiment shown in FIG. 1, same reference numbers are assigned.

The in-vehicle information apparatus 1M includes the main unit 100M and the navigation unit 200M. The main unit 100M is a main unit totally controlling various units constituting the in-vehicle information apparatus 1M, and includes sub units providing the various functions excepting the navigation function and the Bluetooth function. The navigation unit 200M which is connected to the main unit 100M is a function unit providing the car navigation function and the Bluetooth communication function. Although, in this embodiment, the navigation unit 200M is arranged in a housing, the navigation unit 200 may be arranged outside the main unit 100M and may be configured to be detachably attachable to the main unit 100M.

The main unit 100M includes the control unit 100M, the video signal generator 120, the video signal selector 130, the display device 140 and the speaker 150. The control unit 110M totally controls operations of the units constituting the main unit 100M. The video signal generator 120 generates the display screen (the menu unit screen) regarding the various functions provided by the main unit 100M, and outputs the display screen as a video signal. The video signal selector 130 is a switch which selects a video signal of the screen to be displayed from the video signal of the navigation unit screen outputted by the navigation unit 200M which is described later and the video signal of the main unit screen. The display device 140 is a liquid crystal touch panel display configured to display a screen based on the video signal selected by the video signal selector 130 and to accept a user input.

The main unit 100M further includes sub units including the radio unit 160, the optical disc drive unit 170, the USB unit 180 and the AUX unit 190. The radio unit 160 is a function unit which receives radio broadcasting. The optical disc drive unit 170 is a function unit which reproduces the audio data and the video data recorded on an optical disc, such as CD or DVD. The USB unit 180 is a function unit to which an external digital device having a USB (Universal Serial Bus) interface, such as a portable music player, is connected. The AUX unit 190 is a function unit which processes the audio signal and the video signal inputted from an external device through an external input terminal (AUX terminal), and outputs them through the speaker or the display.

The navigation unit 200M includes a main circuit board designed for PND. The main circuit board of the navigation unit 200M includes the control unit 210M, the navigation processing unit 220, the GPS unit 221, the GPS antenna 222, the video signal generating unit 230 and the Bluetooth unit 300. The control unit 210M totally controls the entire navigation unit 200M, and provides the navigation function and Bluetooth function to the main unit 100M. The GPS unit 221 executes position measurement based on GPS (Global Positioning system) signals obtained by the GPS antenna 222, and provides a measurement result to the navigation processing unit 220. The navigation processing unit 220 executes a process regarding the navigation function based on the measurement result obtained from the GPS unit 221 and map information. The video signal generating unit 230 generates a display screen (a navigation unit screen) and sound regarding the function provided by the navigation unit 200M, and outputs them as a video signal and an audio signal to the video signal selector 130 of the main unit.

The Bluetooth unit 300 is a module which realizes the handsfree communication function by connecting by wireless to the mobile phone 2 having the Bluetooth communication function. In this embodiment, the Bluetooth unit 300 is formed as an extension module which is detachably attachable to the main circuit board. In another embodiment, the Bluetooth unit may be directly mounted on the main circuit board, or may be formed as a separate module which is connected to the navigation unit 200 via a cable. To the Bluetooth unit 300, the antenna 310 for performing wireless communication with devices with the Bluetooth function and the microphone 320 for performing handsfree communication are connected.

The control unit 110M of the main unit 100M is provided with the display screen notification unit 112, and a control unit 210M of a navigation unit 200M is provided with the display screen recognition unit 212. The display screen recognition unit 212 of the navigation unit 200M inquires the display screen notification unit 112 about the screen which was selected by the video signal selector 130 at the time of occurrence of the Bluetooth interruption process, and recognizes the screen which was displayed when the Bluetooth interruption process was caused, based on a response from the display screen notification unit 112.

Hereafter, a process regarding the onscreen representation executed when the Bluetooth interruption process occurs in the in-vehicle information apparatus 1M according to the embodiment is explained.

Figure 23:
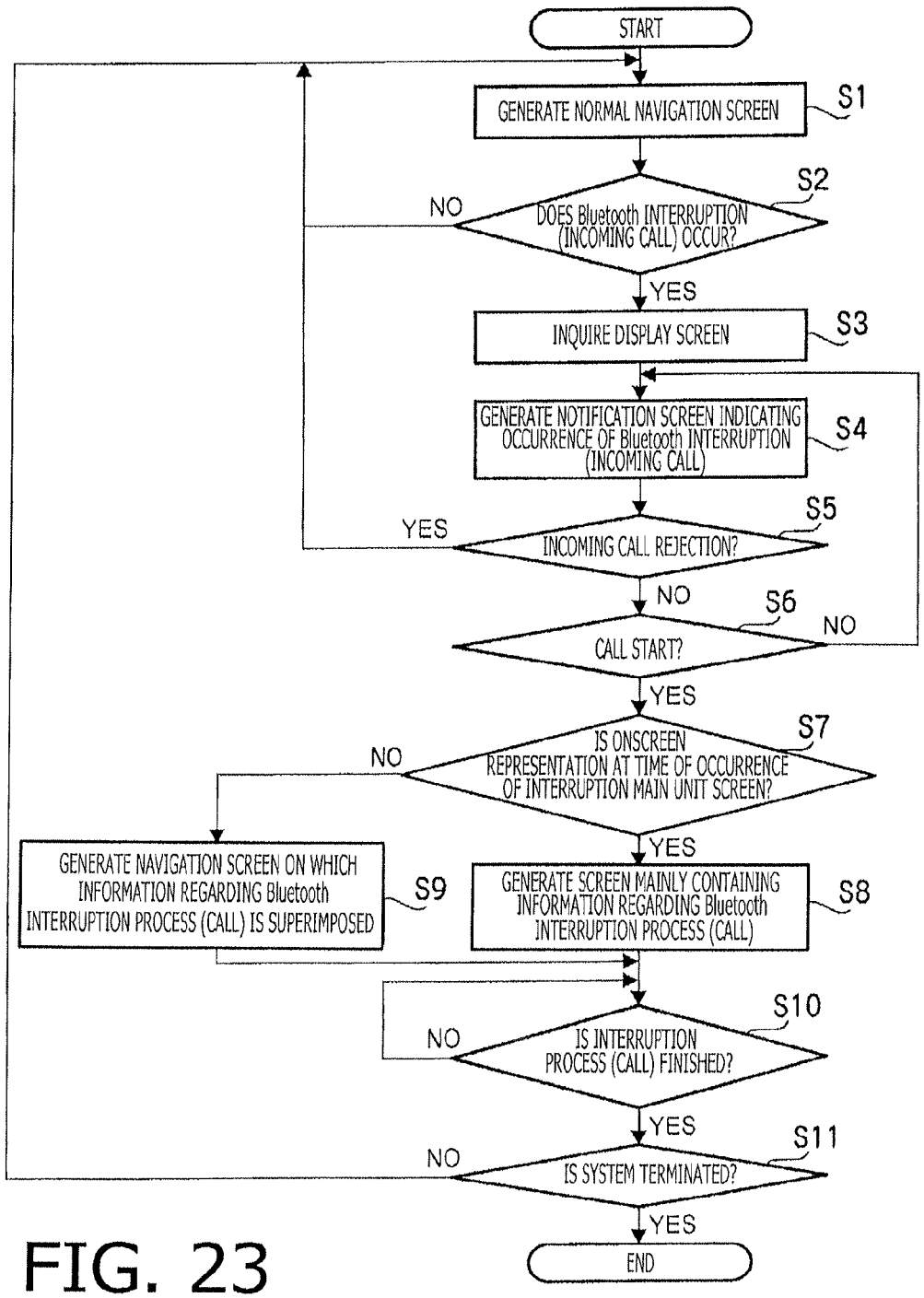
FIG. 23 is a flowchart illustrating a process concerning the onscreen representation executed by the navigation unit when an incoming call is received on a mobile phone in the in-vehicle information apparatus according to the second embodiment of the invention.

First, the case where the Bluetooth interruption process occurs on the in-vehicle information apparatus 1M due to reception of an incoming call on the mobile phone 2 connected by Bluetooth to the Bluetooth unit 300 is explained. FIG. 23 is a flowchart generally illustrating a navigation unit screen generating process executed by the navigation unit 200M when the Bluetooth interruption process occurs due to an incoming call to the mobile phone 1M. The navigation unit screen generating process according to the embodiment realizes the screen transition which meets the user's need and does not give uncomfortable feeling to the user, by determining the screen to be generated during the Bluetooth interruption process in accordance with the screen which was displayed on the display device 140 at the time of reception of an incoming call (at the time of occurrence of the Bluetooth interruption process) and by displaying the screen. In the flowchart of FIG. 23 and the following explanation, a series of "steps" constituting the process is abbreviated by "S". FIGS. 24 and 25 are examples of diagrams illustrating the screen transition displayed on the display device 140. FIG. 24 illustrates the screen transition when the Bluetooth interruption process occurs while the main unit screen is displayed, and FIG. 25 illustrates the screen transition when the Bluetooth interruption process occurs while the navigation unit screen is displayed. As in the case of the first embodiment, the main unit screen is abbreviated as "main screen", the sound generated by the main unit 100 is abbreviated as "main sound", the navigation unit screen is abbreviated as "navi-screen", and the sound generated by the navigation unit 200 is abbreviated as "navi-sound".

First, the screen transition caused when the Bluetooth interruption process occurs during displaying of the main screen is explained with reference to FIGS. 23 and 24.

<Phase A1'>

When the in-vehicle information apparatus 1M starts up, the main unit 100M generates the home screen H (FIG. 12) containing various function selection buttons for selecting the functions to be used by the user. The navigation unit 200M generates the navigation screen N shown in FIG. 14 to be displayed in a normal state (i.e., a state where no interruption process is being processed). At this time, the control unit 110M judges that the menu function provided by the main unit 100M is the function mainly used by the user, and controls the video signal selector 130 to select the main screen. Thus, the home screen H is displayed on the display device 140.

<Phase A2'>

When the user touches the radio function selection button b1 on the home screen H, the screen generated by the main unit 100M is changed to the radio reception screen T shown in FIG. 13. Since the function provided by the main unit 100M is mainly used successively, the video signal selector 130 successively selects the main screen, and the radio reception screen T is displayed on the display device 140.

<Phase A3>

When an incoming call arrives at the mobile phone 2, the incoming call is notified from the mobile phone 2 to the Bluetooth unit 300 via the wireless Bluetooth link, and the Bluetooth interruption process occurs. When the Bluetooth interruption process occurs (S2: YES), the display screen recognition unit 212 of the navigation unit 200M notifies the display screen notification unit 112 of the main unit 100M of occurrence of the interruption process, and inquires the display screen notification unit 112 about which of the main screen and the navi-screen is the screen being displayed on the display device 140 (i.e., the screen being selected by the video signal selector 130) (S3).

The display screen notification unit 112 which has received the inquiry from the display screen recognition unit 212 of the navigation unit 200M in S3 notifies the display screen recognition unit 212 of the screen which was displayed on the display device 140 when the inquiry was received. In this case, the fact that the screen which was displayed when the inquiry from the display screen recognition unit 212 was received is the main screen is notified to the display screen recognition unit 212.

Figure 15:
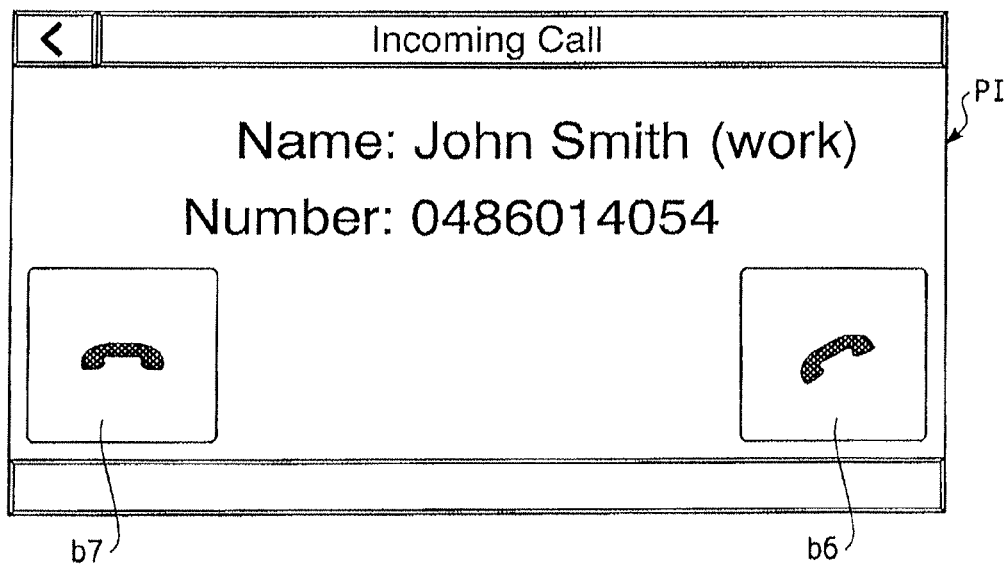
FIG. 15 is an example of an incoming call screen PI displayed when an incoming call is received.

Next, the navigation unit 200M switches the screen to be generated to the incoming call screen PI shown in FIG. 15 (S4). On the other hand, when receiving notification indicating occurrence of the Bluetooth interruption process, the control unit 110M of the main unit 100M switches the video signal selector 130 to select the screen (navi-screen) generated by the navigation unit 20M which serves to process the Bluetooth interruption process and to relay the screen to the display device 140. Therefore, in this case the incoming call screen PI generated by the navigation unit 200M is displayed on the display device 140. The incoming call screen PI is a screen for notifying the user of reception of an incoming call on the mobile phone 2 (i.e., occurrence of the Bluetooth interruption process). In the incoming call screen PI, a name ("Name") and a phone number ("Number") of a caller are displayed. These pieces of information are stored in the phonebook database held on the mobile phone 2, and is transmitted from the mobile phone 2 to the navigation unit 200M via the Bluetooth wireless link, together with the notification of reception of the incoming call. While the Bluetooth interruption process continues (Phase A3', A4'-a), the video signal selector 130 is controlled to constantly select the navi-screen, and the navi-screen is successively displayed on the display device 140. Although the video signal selector 130 is switched to display the navi-screen on the display device 140 when the Bluetooth interruption process occurs, the video signal generating unit 120 successively generates the radio reception screen T which is the same as that display when the interruption process occurs (Phase A2'), until the Bluetooth interruption process is finished.

<Phase A4'-a>

Furthermore, in the incoming call screen PI, the call start button b6 and the incoming call rejection button b7 are displayed. When the incoming call rejection button b7 is pressed (S5: YES), the process of the navigation unit 200M returns to S1, and the normal navigation screen N (FIG. 14) is generated again. The control unit 110M of the main unit 100M controls the video signal selector 130 to restore the onscreen representation to the screen (the main screen) which was selected at the time of occurrence of the Bluetooth interruption process. As described above, since the screen generated by the main unit 100M is not changed during execution of the Bluetooth interruption process, the radio reception screen T (FIG. 13) which was displayed at the time of occurrence of the Bluetooth interruption process is displayed on the display device 140. That is, the onscreen representation returns to the state at the time of reception of the incoming call.

<Phase A4'-b>

When the call start button b6 is pressed (S6: YES), the screen generated by the navigation unit 200M changes to the screen which is appropriate for representation during the call (S7-S9). In response to the screen which was displayed at the time of occurrence of the Bluetooth interruption process (at the time of reception of the incoming call), the in-vehicle information apparatus 1M according to the embodiment determines and displays the screen which is appropriate for representation during the call. In this case, since the main screen was displayed at the time of reception of the incoming call (S7: YES), the navigation unit 200M generates the call screen PC (FIG. 16) which mainly displays the information regarding the Bluetooth interruption process (i.e., the call function) (or which displays only the information regarding the call function) (S8). As shown in FIG. 16, in the call screen PC (FIG. 16), a call time ("Call Time") and the indicator (antenna mark a) indicating the intensity of received radio wave as well as a name ("Name") and a phone number ("Number") of a caller are displayed. Since the onscreen representation at the time of reception of the incoming call on the mobile phone 2 is not the navigation screen N (FIG. 14) but is the radio reception screen T (FIG. 13), it can be judged that the user does not strongly want the navigation information. There is a high possibility that displaying the navigation information all of a sudden may give uncomfortable felling to the user. On the other hand, providing the information regarding a call to the user during a call meets the user's need, and does not give an uncomfortable feeling to the user. Therefore, when the main unit screen was displayed at the time of occurrence of a Bluetooth interruption process, the in-vehicle information apparatus 1M according to the embodiment displays, during the call, the call screen PC containing mainly the information relating to the call.

<Phase A5'>

Furthermore, the call-end button b8 is displayed on the call screen PC (FIG. 16). When the user touches the call-end button b8 (S10: YES), the process of the navigation unit 200M returns to S1 (S11: NO), and the normal navigation screen N (FIG. 14) is generated. When the Bluetooth interruption process terminates (call ending), the control unit 110M of the main unit 100M controls the video signal selector 130 to restore the onscreen representation to the screen (the main screen in this case) which was selected at the time of occurrence of the interruption process. As described above, the main screen is not changed during execution of the Bluetooth interruption process, the radio reception screen T which was displayed at the time of occurrence of the interruption process is displayed on the display device 140. That is, the onscreen representation returns to the state at the time of reception of the incoming call.

The aforementioned explanation is the process regarding the onscreen representation executed when the Bluetooth interruption process occurs during displaying of the main screen.

Next, the screen transition executed when the Bluetooth interruption process occurs during displaying of the navi-screen is explained with reference to FIGS. 23 and 25. In the following, the explanation focuses on the points different from the process executed when the interruption process occurs during displaying of the main unit screen, to avoid duplication of explanations.

<Phase B2'>

When the user touches the navigation function selection button b2 on the home screen H, the screen selected by the video signal selector 130 is switched to the navi-screen, and the normal navigation screen N is displayed on the display device 140. The navigation screen N shown in FIG. 14 is an example of the navigation screen which the navigation unit 200M generates during the normal state S1 where the Bluetooth interruption process is not being executed.

<Phase B3'>

When the Bluetooth interruption process occurs during displaying of the navi-screen, the process which is the same as that of the above described phase A3' is executed, and the incoming call screen PI (FIG. 15) is displayed. The video signal selector 130 successively selects the navi-screen.

<Phase B4'-a>

When the incoming call rejection button b7 is touched on the incoming call screen PI (FIG. 15), the process returns to S1, and the screen generated by the navigation unit 200M is changed to the normal navigation screen N (FIG. 14). The control unit 110M of the main unit 100M controls the video signal selector 130 to restore the onscreen representation to the screen (the main unit screen) which was selected at the time of occurrence of the Bluetooth interruption process. Therefore, the video signal selector 130 successively selects the navi-screen. Therefore, the normal navigation screen N (FIG. 14) which was displayed at the time of occurrence of the Bluetooth interruption process is displayed on the display device 140. That is, the onscreen representation returns to the state at the time of reception of the incoming call.

<Phase B4'-b>

When the user touches the call start button b6 on the incoming call screen PI (FIG. 15) (S6: YES), the screen generated by the navigation unit 200M changes to the screen appropriate for representation during a call (S7-9). Since the navi-screen was displayed at the time of occurrence of the Bluetooth interruption process (S7: NO), the process S8 which generates the call screen PC (FIG. 16) not containing the navigation information, and instead the process S9 which generates the line-busy navigation screen NC (FIG. 17) containing mainly the navigation information is executed. The line-busy navigation screen NC is a screen in which the small call-end icon b9 is superimposed at the upper right position of the navigation screen N (FIG. 14).

Since the navigation screen N (FIG. 14) was displayed at the time of reception of the incoming call on the mobile phone 2, it can be judged that the user strongly wants the information regarding the navigation function. Although the information displayed on the call screen PC (FIG. 16) generated in the process S8 is information contributing to convenience for the user, the onscreen screen representation during the call is not essential excepting the call-end button b8. Therefore, when the navigation screen N was displayed at the time of reception of an incoming call, it is considered that displaying the screen mainly including the information regarding the navigation function meets the user's need. Furthermore, such onscreen representation does not give uncomfortable feeling to the user. Accordingly, when the navigation screen N was displayed at the time of reception of an incoming call, the in-vehicle information apparatus 1M according to the embodiment displays the line-busy navigation screen NC (FIG. 17) during the call.

<Phase B5'>

When the user touches the call-end button b9 displayed small at the upper right position on the line-busy navigation screen NC (S10: YES), the process of the navigation unit 200M returns to S1 (S11: NO), and the normal navigation screen N (FIG. 14) is generated again. Since the navi-screen was displayed at the time of occurrence of the Bluetooth interruption process, the control unit 110M of the main unit 100M controls the video signal selector 139 to successively select the navi-screen. As a result, the normal navigation screen N which was displayed at the time of occurrence of the interruption is displayed on the display device 140. That is, the onscreen representation returns to the state at the time of occurrence of the incoming call.

The aforementioned explanation is the process regarding the onscreen representation executed when the Bluetooth interruption process occurs during displaying of the navi-screen.

Although the above explained process corresponds to the case where the Bluetooth interruption process occurs due to the incoming call on the mobile phone 2, the Bluetooth interruption process also occurs and thereby the screen transition occurs when an outgoing call is initiated from the mobile phone 2. The in-vehicle information apparatus 1M also realizes the transition which meets the user's need and does not give an uncomfortable feeling to the user in the Bluetooth interruption process caused by the outgoing call, by determining the screen generated during the call (during execution of the Bluetooth interruption process) in accordance with the screen which was displayed on the display device 140 at the time of initiation of the outgoing call (at the time of occurrence of the Bluetooth interruption process) and by displaying the screen.

In the following, explanation is given with reference to the process regarding the onscreen representation executed when the user initiates an outgoing call to another mobile phone from the mobile phone 2 connected by wireless to the Bluetooth unit 300 and the Bluetooth interruption process occurs in the in-vehicle information apparatus 1.

Figure 26:
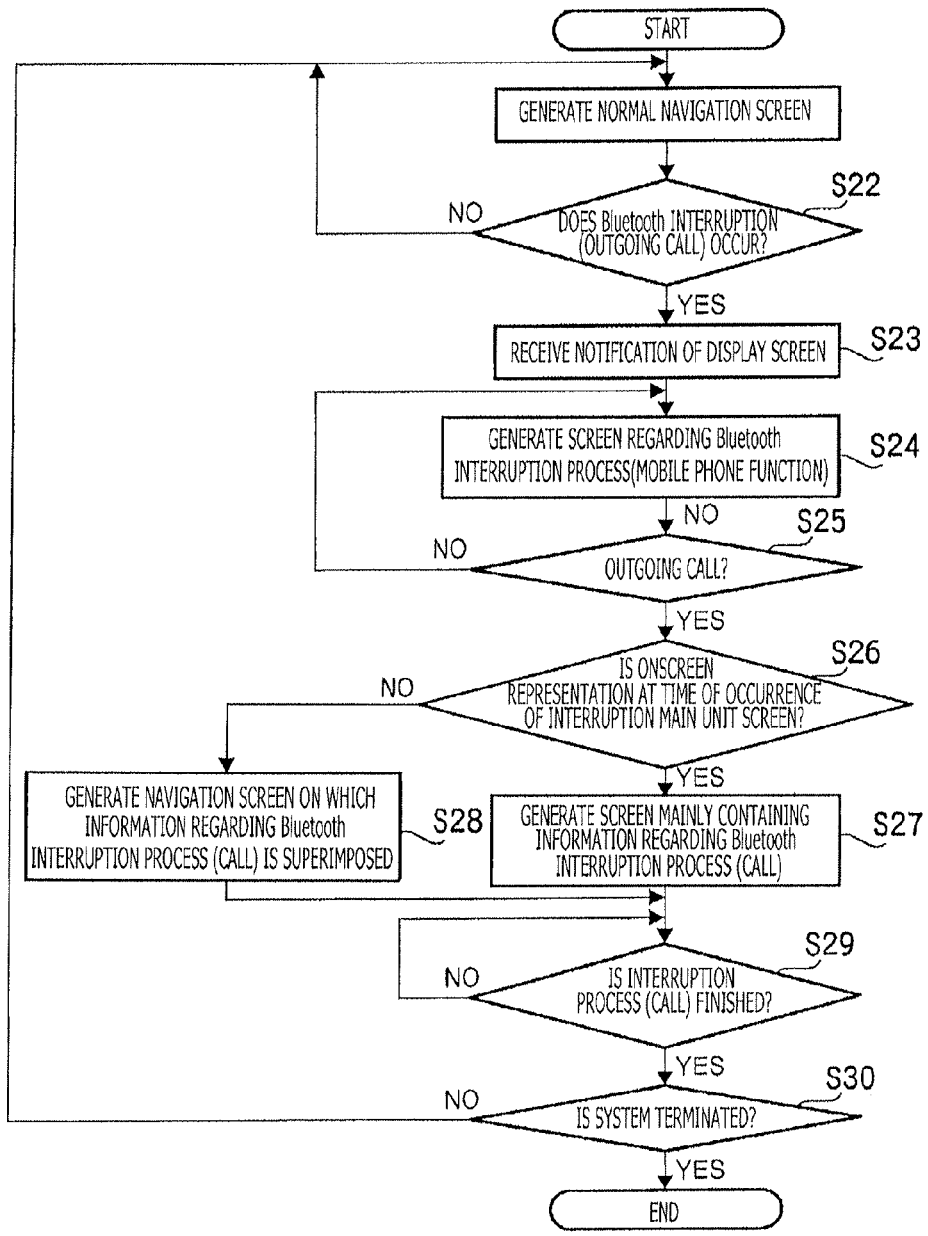
FIG. 26 is a flowchart illustrating a process concerning the onscreen representation executed by the navigation unit hen an outgoing call is initiated from the mobile phone in the in-vehicle information apparatus according to the second embodiment of the invention.

FIG. 26 is a flowchart generally illustrating a navigation unit screen generating process executed by the navigation unit 200M when an outgoing call is initiated from the mobile phone 2. Each of FIGS. 27 and 28 is an example of the screen transition displayed on the display device 140 before and after the Bluetooth interruption process caused by initiation of an outgoing call. FIG. 27 illustrates the screen transition caused when the Bluetooth interruption process occurs during displaying of the main screen, and FIG. 28 illustrates the screen transition caused when the Bluetooth interruption process occurs during displaying of the navi-screen.

First, the screen transition caused when the Bluetooth interruption process occurs during displaying of the main screen is explained with reference to FIGS. 26 and 27. Here, the explanation is given by taking the case where an outgoing call is initiated from the mobile phone 2 through the handsfree communication function during displaying of the radio reception screen T (FIG. 13). In the following, the explanation focuses on the points different from the process executed when the interruption process occurs due to an incoming call, to avoid duplication of explanations.

<Phase C3'>

The home button h for switching to the home screen H (FIG. 12) is displayed at the upper right position on the radio reception screen T (FIG. 13). The home screen H is used by the user to use the menu function provided by the main unit 100M. When the home button h is touched, the screen generated by the video signal generating unit 120 of the main unit 100M is changed from the radio reception screen T to the home screen H. The video signal selector 130 successively selects the main screen, and the home screen H is displayed on the display device 140. The home screen H contains the call function selection button b3 for selecting the handsfree communication function using the mobile phone 2 having the Bluetooth communication function.

<Phase C4'>

When the user touches the call function selection button b3 on the home screen H, the Bluetooth interruption process occurs (S22: YES). At this time, the display screen notification unit 112 of the main unit 100M notifies the display screen recognition unit 212 of the navigation unit 200M of the fact that the Bluetooth interruption process has occurred and the main screen was displayed on the display device 140 at the time of occurrence of the Bluetooth interruption process (S23). It should be noted that the screen which was displayed at the time of occurrence of the Bluetooth interruption process means the screen which was displayed when the user selected the call function and started the operation for causing the Bluetooth interruption process.

When receiving the notification indicating occurrence of the Bluetooth interruption process (selection of the mobile phone function) by the user operation from the main unit 100M, the navigation unit 200M starts generating the screen regarding the mobile phone function (S24). After occurrence of the Bluetooth interruption process, the navigation unit 200M generates first the telephone menu screen PM (FIG. 18). The video signal selector 139 switches the selection screen to the navi-screen, and the telephone menu screen PM is displayed on the display device 140. The video signal selector 130 successively select the nav-screen until the Bluetooth interruption process terminates, and the navi-screen is displayed on the display device 140. The telephone menu screen PM contains the phonebook button b11 for displaying the phonebook list screen.

<Phase C5'>

When the user touches the phonebook button b11 on the telephone menu screen PM (FIG. 18), the screen generated by the navigation unit 200M is changed to the phonebook list screen PB (FIG. 19). The phonebook list screen PB is the screen for selecting the party to which the user initiates an outgoing call, and, for example, name information of each record registered in the phonebook database is displayed as a list.

<Phase C6'>

When the user touches one of the pieces of name information b12 displayed as the list, the phonebook record detailed screen PA (FIG. 20) corresponding to the touched name information b12 is generated by the navigation unit 200M and is displayed on the display device 140. The phonebook record detailed screen PA is a screen for confirming the party to which the user initiates the outgoing call, and the detailed information, such as the name ("Name") and the phone number ("Number") of each record, is contained in the phonebook record detailed screen PA. Furthermore, the phonebook record detailed screen PA contains the call button b13 for initiating an outgoing call to the displayed phone number.

<Phase C7'>

When the user touches the call button b12 on the phonebook record detailed screen PA (FIG. 20) (S25: YES), the navigation unit 200M determines the screen appropriate for displaying during a call, in accordance with the screen displayed at the time of occurrence of the Bluetooth interruption process notified in S23 from the display screen notification unit 112 of the main unit 100M. In this case, since the radio reception screen T (FIG. 13) which is the main screen not containing the information regarding the navigation function was displayed at the time of occurrence of the Bluetooth interruption process (S26: YES), it can be judged that the user does not strongly want the navigation information. Therefore, when the main screen was displayed at the time of occurrence of the Bluetooth interruption process, the in-vehicle information apparatus 1M according to the embodiment displays the call screen PC (FIG. 16) which mainly contains the information regarding the mobile phone function during a call (S27).

<Phase C8'>

When the user touches the call button b8 on the call screen PC (FIG. 16) (S29: YES), the Bluetooth interruption process terminates, the process of the navigation unit 200M returns to S1 (S30: NO), and the normal navigation screen N (FIG. 14) is generated. The control unit 110M of the main unit 100M switches the screen which is generated by controlling the video signal selector 130, to the radio reception screen T (FIG. 13) which was displayed at the time of occurrence of the Bluetooth interruption process. Furthermore, the control unit 110M controls the video signal selector 130 to select the main screen which was displayed at the time of occurrence of the interruption process. As a result, the radio reception screen T is displayed on the display device 140, and the onscreen representation returns to the state at the time when the user started the operation for making a call.

The aforementioned explanation is the process regarding the onscreen representation executed when the Bluetooth interruption process occurs due to the user operation (initiation of an outgoing call) during displaying of the main screen.

Next, the screen transition executed when the Bluetooth interruption process is caused by the user operation during displaying of the navi-screen is explained with reference to FIGS. 26 and 28. In the following, the explanation focuses on the points different from the process executed when the interruption process occurs during displaying of the main screen, to avoid duplication of explanations.

<Phase D3'>

At the lower right position on the normal navigation screen N (FIG. 14), the Menu button b5 for switching the onscreen representation to the home screen H (FIG. 12) is displayed. When the Menu button b5 is touched, the screen selected by the video signal selector switches to the main screen. In this case, since the main unit 100M generates the home screen H, the home screen H is displayed on the display device 140. It should be noted that when the main unit 100M generated another screen (e.g., the radio signal screen T) when the Menu button b5 was touched, the screen generated by the main unit 100M is changed to the home screen H.

<Phase D4'>

When the user touches the call function selection button b3 on the home screen H, the Bluetooth interruption process occurs (S22: YES). At this time, the display screen notification unit 112 of the main unit 100M notifies the display screen recognition unit 212 of the fact that the Bluetooth interruption process has occurred due to the user operation and the navi-screen was displayed on the display device 140 at the time of occurrence of the Bluetooth interruption process (S23). It should be noted that the screen which was displayed at the time of occurrence of the Bluetooth interruption process means the screen which was displayed when the user selected the call function and started the operation for causing the Bluetooth interruption process.

<Phase D7'>

When the user touches the call button b13 on the phonebook record detailed screen PA (FIG. 20), the navigation unit 200M determines and displays the screen appropriate for displaying during a call, in accordance with the screen which was displayed at the time of occurrence of the Bluetooth interruption process notified by the display screen notification unit 112 of the main unit 100M in S23. In this case, since the navi-screen which is the navigation screen N (FIG. 14) was displayed at the time of occurrence of the Bluetooth interruption process (i.e., when the user started the operation for making a call) (S26: NO), it can bf judged that the user strongly wanted the navigation information. Therefore, the in-vehicle information apparatus 1M according to the embodiment displayed the line-busy navigation screen NC (FIG. 17) containing mainly the information regarding the navigation function (S28).

<Phase D8'>

When the user touches the call-end button b9 on the line-busy navigation screen NC (FIG. 17) (S29: YES), the Bluetooth interruption process terminates, the process of the navigation unit 200M returns to S1 (S30: NO), and the normal navigation screen N (FIG. 14) is generated again. Since the navi-screen was displayed at the time of occurrence of the Bluetooth interruption process, the control unit 110M of the main unit 100M controls the video signal selector to successively select the navi-screen. As a result, the normal navigation screen N which was displayed at the time of occurrence of the interruption process is displayed on the display device 140. That is, the onscreen representation returns to the state at the time of reception of the incoming call.

As described above, the navigation unit 200M according to the embodiment inquires the main unit 100M about which of the navi-screen and the main screen is being displayed, and switches the onscreen representation based on a result of the inquiry. When the navi-screen was displayed at the time of occurrence of the Bluetooth interruption process, the navigation unit 200M generates the line-busy navigation screen NC (FIG. 17) containing mainly the navigation information. On the other hand, when the main screen was displayed at the time of occurrence of the Bluetooth interruption process, the navigation unit 200M generates the call screen PC (FIG. 16) displaying mainly the information regarding the Bluetooth function (call). That is, since the navigation unit 200M is configured to generate the onscreen representation during the call in accordance with the onscreen representation presented at the time of occurrence of the Bluetooth interruption process, it is possible to display a natural screen which does not give uncomfortable feeling to the user. Furthermore, when the Bluetooth interruption process terminates, the main unit 100M judges which of the navi-screen and the main screen was displayed at the time of occurrence of the Bluetooth interruption process, and moves the screen back to the one before occurrence of the Bluetooth interruption process. Such a configuration makes it possible to prevent a screen which is not intended by the user from being displayed in response to occurrence of the Bluetooth interruption process.

The embodiment according to the invention is not limited to those explained above. Although the above described embodiments are examples configured by applying the invention to the process where the voice communication is performed with the mobile phone 2 connected to the in-vehicle information apparatus 1 or 1M via the Bluetooth wireless link, the present invention can also be applied to the case where another function (e.g., the mail function or the data communication function) of the mobile phone is used via the in-vehicle information apparatus 1 or 1M. Furthermore, the present invention can also be applied to the case where a digital information apparatus having the Bluetooth communication function other than the mobile phone, such as a portable music player, is used via the in-vehicle information apparatus. For example, in the case where a portable AV player is connected by Bluetooth, it is judged that the necessity of the navigation information is low if the radio reception screen was displayed at the time of start of the interruption process, and in this case the screen displaying mainly information regarding sound and video being reproduced during execution of the interruption process of the portable AV player. If the navigation screen N was displayed at the time of start of the interruption process, it can be judged that the necessity of the navigation information is high, and in this case the screen displaying mainly the navigation information is displayed during execution of the interruption process of the portable AV player. Such onscreen representation meets the user's need and does not give an uncomfortable feeling to the user.

The connection manner for connecting the in-vehicle information apparatus 1 or 1M with a digital information apparatus is not limited to Bluetooth (IEEE 802.15.1), but the present invention can also be applied to the case where various types of wireless connection schemes, such as a short-range wireless communication manner other than Bluetooth, e.g., UWB (Ultra Wide Band), various types of wireless LAN schemes, e.g., IEEE802.11, various types of wireless data bus schemes, e.g., Wireless USB, or various types of wired connection schemes, e.g., USB or IEEE 1394.

The above described embodiment can be effectively used when a main circuit board designed for PND is used as the navigation unit. The above described embodiment can also be applied to a frame-mount type or a portable type in-vehicle information apparatus configured such that an existing main circuit board designed for another product or a general purpose product is used as a navigation unit. For example, the present invention can be applied in the case where the invention is used as a navigation unit of an in-vehicle information apparatus using an navigation module of another vender, such as an OEM specialized producer, or the present invention can be applied to the case where a navigation unit of an old type in-vehicle information apparatus is used as a navigation unit of a new type in-vehicle information apparatus. According to the configurations described in the claims of this application, it becomes possible to cause the screen generated by the navigation unit to cooperate with the onscreen representation of the main unit while using the existing main circuit board as a navigation unit without design change. As a result, the screen transition which does not give an uncomfortable feeling to the user and meets the user's need can be realized at low cost.

Although, in the above described embodiment, the main unit 100 or 100M and the navigation unit 200 or 200M are arranged on the same housing, they may be arranged respectively in separate housings. The navigation unit 200 or 200M may be configured to be detachably attachable to the main unit 100 or 100M. For example, the in-vehicle information apparatus 1 or 1M may be configured to be a frame-mount type, and the navigation unit 200 or 200M may be detachable attachable to the main unit 100 or 100M foxed to a vehicle so that the navigation unit 200 or 200M functions as a portable navigation apparatus which is separately used by removing from the main unit 100 or 100M. In this case, in the navigation unit, a user interface, such as a display and operation buttons, as well as a power supply device are provided.

What is claimed is:

1. An in-vehicle information apparatus, comprising:
a main unit having a display device; and
a navigation unit providing a navigation function to the main unit,
the navigation unit comprising:
a navigation processing unit which executes a process concerning the navigation function;
a sub unit providing a communication function for communicating with an external device, the communication function provided by the sub unit being executed as an interruption process; and
a navigation unit screen generating unit which generates, as a navigation unit screen, one of a first screen displaying information concerning the navigation function, a second screen displaying information concerning the communication function and a third screen in which the information concerning the communication function is superimposed on the information concerning the navigation function;
the main unit comprising:
an operation unit which receives an input for selecting a function from a user;
a main unit screen generating unit which generates a main unit screen for displaying information concerning a function which the main unit provides;
a video selector which selects one of the navigation unit screen and the main unit screen and provides the selected one to the display device; and
a display screen notification unit which notifies the navigation unit of a screen which the video selector has provided to the display device at a time of occurrence of the interruption process;
wherein:
the video selector selects one of the navigation unit screen and the main unit screen based on the function inputted to the operation unit and the communication function executed as the interruption process; and
the navigation unit screen generating unit generates one of the first screen, the second screen and the third screen based on the function inputted to the operation unit and the interruption process and further based on the screen notified by the display screen notification unit,
wherein the in-vehicle information apparatus further comprises:
a first screen transition table used when the video selector has selected the main unit screen at a time of occurrence of the interruption process; and
a second screen transition table used when the video selected has selected the navigation unit screen at a time of occurrence of the interruption process,
wherein:
if the video selector has selected the main unit screen at the time of occurrence of the interruption process, a first plurality of screen changes as defined by the first screen transition table causes the display device to display the second screen generated by the navigation unit screen generating unit,
if the video selector has selected the navigation unit screen at the time of occurrence of the interruption process, a second plurality of screen changes as defined by the second screen transition table causes the display device to change its display from the second screen to the third screen generated by the navigation unit screen generating unit.

2. The in-vehicle information apparatus according to claim 1, wherein:
software for the navigation function for generating the first screen or the third screen and software for the communication function for generating the second screen are installed in the navigation unit screen generating unit; and
the navigation unit screen generating unit switches between the software for the navigation function and the software for the communication function based on a command from the main unit.

3. The in-vehicle information apparatus according to claim 1, wherein:
said display screen notification unit notifies the navigation unit of a screen which the video selector has provided to the display device at a time of occurrence of the interruption process; and
the navigation unit screen generating unit generates one of the second screen and the third screen based on a notification from the display screen notification unit.

4. The in-vehicle information apparatus according to claim 3,
wherein the navigation unit further comprises a display screen recognition unit which obtains the notification from the display screen notification unit and recognizes a screen which has been displayed on the display device at a time of occurrence of the interruption process, based on the notification.

5. The in-vehicle information apparatus according to claim 1,
further comprising a display screen notification request unit which requires the notification from the display screen notification unit.

6. The in-vehicle information apparatus according to claim 5,
wherein the display screen notification request unit requires the notification from the display screen notification unit when the interruption process occurs.

7. The in-vehicle information apparatus according to claim 1, wherein the sub unit is a Bluetooth wireless technology unit which provides Bluetooth wireless technology communication with the external device.

8. The in-vehicle information apparatus according to claim 1, wherein the external device is a mobile phone.

9. The in-vehicle information apparatus according to claim 8,
wherein the interruption process is a process for using a handsfree communication function of the mobile phone.

10. The in-vehicle information apparatus according to claim 1,
wherein a main circuit board designed for a general-purpose or a different navigation apparatus is mounted on the navigation unit.

* * * * *

UNITED STATES PATENT AND TRADEMARK OFFICE
CERTIFICATE OF CORRECTION

PATENT NO. : 9,841,293 B2  
APPLICATION NO. : 13/318376  
DATED : December 12, 2017  
INVENTOR(S) : Kiyoshi Nakayama et al.

Page 1 of 1

It is certified that error appears in the above-identified patent and that said Letters Patent is hereby corrected as shown below:

On the Title Page

Item (54) and in the Specification, Column 1, Line 1-3 in the title, please correct the title to read "IN-VEHICLE INFORMATION APPARATUS"

Signed and Sealed this  
First Day of May, 2018

Andrei Iancu  
*Director of the United States Patent and Trademark Office*